US008268430B2

(12) United States Patent
Johnson et al.

(10) Patent No.: US 8,268,430 B2
(45) Date of Patent: Sep. 18, 2012

(54) MANUFACTURED WOOD PRODUCT

(75) Inventors: Gregory Lawrence Johnson, Port Mandurah (AU); Jian Hua Li, Anji County, Zhejian Province (CN)

(73) Assignee: Style Limited, Melbourne (AU)

( * ) Notice: Subject to any disclaimer, the term of this patent is extended or adjusted under 35 U.S.C. 154(b) by 916 days.

(21) Appl. No.: 12/235,511

(22) Filed: Sep. 22, 2008

(65) Prior Publication Data

US 2010/0075095 A1 Mar. 25, 2010

(30) Foreign Application Priority Data

Sep. 19, 2008 (CN) .......................... 2008 1 0149352

(51) Int. Cl.
*B32B 3/06* (2006.01)
*B32B 37/02* (2006.01)
*B32B 38/04* (2006.01)
*B29C 65/52* (2006.01)

(52) U.S. Cl. ............................ 428/54; 428/98; 428/221

(58) Field of Classification Search .................... 428/54, 428/98, 221

See application file for complete search history.

(56) References Cited

U.S. PATENT DOCUMENTS

| | | | |
|---|---|---|---|
| 3,723,230 | A | 3/1973 | Troutner |
| 4,061,819 | A | 12/1977 | Barnes |
| 4,146,123 | A | 3/1979 | Cottrell |
| 4,213,748 | A | 7/1980 | Ahrweiler |
| 4,232,067 | A | 11/1980 | Coleman |
| 4,255,477 | A | 3/1981 | Holman |
| RE30,636 | E | 6/1981 | Barnes |
| 4,303,111 | A | 12/1981 | Neville |
| 4,421,149 | A | 12/1983 | Barnes et al. |
| 4,508,772 | A | 4/1985 | Churchland et al. |
| 4,563,237 | A | 1/1986 | Churchland et al. |
| 4,704,316 | A | 11/1987 | Grace |
| 4,711,689 | A | 12/1987 | Coleman |
| 4,810,551 | A | 3/1989 | Chu |
| 5,016,692 | A | 5/1991 | Cremona |
| 5,161,591 | A | 11/1992 | Sealey et al. |
| 5,441,787 | A | 8/1995 | Fujii et al. |
| 5,505,238 | A | 4/1996 | Fujii et al. |
| 5,543,197 | A | 8/1996 | Plaehn |

(Continued)

FOREIGN PATENT DOCUMENTS

AU 714398 8/1997

(Continued)

OTHER PUBLICATIONS

International Search Report dated Apr. 19, 2010 for PCT Application No. PCT/IB2010/000199 filed Jan. 14, 2010.

(Continued)

*Primary Examiner* — Brent O'Hern

(74) *Attorney, Agent, or Firm* — Knobbe, Martens, Olson & Bear, LLP

(57) ABSTRACT

A method for producing a manufactured wood product using less desirable or discarded natural wood and a manufactured wood product produced by the described method. This inventive method comprises utilizing less desirable or discarded natural wood pieces by slicing the wood pieces into elongated strips that are then partially separated into elongate sections that maintain fibrous connectivity between the elongate sections. The elongate sections are dried and covered or impregnated with an adhesive. A second drying follows the adhesive application and the elongated strips are then arranged lengthwise in a mold for cold or hot pressing.

9 Claims, 18 Drawing Sheets

U.S. PATENT DOCUMENTS

| | | | | |
|---|---|---|---|---|
| 5,786,063 | A | 7/1998 | Shibusawa et al. | |
| 5,972,467 | A | 10/1999 | Washo | |
| 5,976,644 | A | 11/1999 | Sanaee et al. | |
| 6,432,254 | B1 | 8/2002 | Black et al. | |
| 6,722,093 | B2 | 4/2004 | Dauplay | |
| 6,895,723 | B2 | 5/2005 | Knokey et al. | |
| 7,147,745 | B1 | 12/2006 | Slaven, Jr. et al. | |
| 7,152,379 | B2 | 12/2006 | Lin et al. | |
| 7,661,450 | B2 | 2/2010 | Wang | |
| 2004/0040253 | A1 * | 3/2004 | Knokey et al. | 52/729.4 |
| 2004/0206037 | A1 | 10/2004 | Bennett | |
| 2006/0208385 | A1 | 9/2006 | Ceritoglu | |
| 2007/0111019 | A1 | 5/2007 | Lau et al. | |
| 2008/0023868 | A1 | 1/2008 | Slaven et al. | |
| 2010/0075095 | A1 | 3/2010 | Johnson et al. | |
| 2010/0119857 | A1 | 5/2010 | Johnson et al. | |

FOREIGN PATENT DOCUMENTS

| | | | |
|---|---|---|---|
| CA | 966409 | | 4/1975 |
| CA | 2671385 | | 6/2008 |
| CN | 1180604 | A | 5/1998 |
| CN | 2359362 | Y | 1/2001 |
| CN | 2483160 | Y | 3/2002 |
| CN | 1460592 | A | 12/2003 |
| CN | 2592772 | | 12/2003 |
| CN | 1133533 | | 1/2004 |
| CN | 2810940 | | 6/2006 |
| CN | 1851196 | | 10/2006 |
| CN | 1906030 | A | 1/2007 |
| CN | 1912311 | | 2/2007 |
| CN | 2926379 | | 7/2007 |
| CN | 101004102 | | 7/2007 |
| CN | 200939643 | | 8/2007 |
| CN | 101036994 | | 9/2007 |
| CN | 101104284 | | 1/2008 |
| CN | 101104286 | A | 1/2008 |
| CN | 201042818 | | 4/2008 |
| CN | 201052630 | | 4/2008 |
| CN | 101298153 | A | 5/2008 |
| CN | 201124519 | Y | 10/2008 |
| CN | 201168993 | | 12/2008 |
| CN | 201192872 | | 2/2009 |
| CN | 101524862 | | 9/2009 |
| CN | 100588518 | C | 2/2010 |
| CN | 1935923 | | 5/2010 |
| CN | 101310945 | B | 12/2010 |
| DE | 100 08 647 | | 6/2001 |
| EP | 0666155 | A1 | 8/1995 |
| EP | 1837146 | | 9/2007 |
| GB | 353186 | | 7/1931 |
| GB | 743114 | | 1/1956 |
| GB | 2234935 | | 2/1991 |
| GB | 2292336 | | 2/1996 |
| JP | 2002127115 | A | 5/2002 |
| MX | 204281 | | 1/1999 |
| RU | 2231442 | C2 | 6/2004 |
| WO | WO 99/47347 | | 9/1999 |
| WO | WO 03/086721 | A1 | 10/2003 |
| WO | WO 2005/070667 | | 8/2005 |
| WO | WO 2009/118574 | A | 10/2009 |
| WO | WO 2009/140136 | | 11/2009 |
| WO | WO 2010/032080 | | 3/2010 |
| WO | WO 2010/082137 | | 7/2010 |

OTHER PUBLICATIONS

International Search Report dated Apr. 30, 2009 for PCT Application No. PCT/IB2008/003829 filed Sep. 22, 2008.

International Search Report dated Apr. 8, 2010 for PCT Application No. PCT/IB2010/000209 filed Jan. 14, 2010.

Wood Handbook. Madison: Forest Products Laboratory, 1999.

Corrugated Bamboo Roofing Sheets. International Network for Bamboo and Rattan Technology Pages, 2 pages, 2006.

International Search Report and Written Opinion dated Nov. 4, 2010 of PCT Application No. PCT/CN2010/070214 filed Jan. 15, 2010.

International Search Report and Written Opinion dated Oct. 28, 2010 of PCT Application No. PCT/CN2010/07025 filed Jan. 15, 2010.

International Search Report and Written Opinion dated Sep. 16, 2010 of PCT Application No. PCT/CN2010/070219 filed Jan. 15, 2010.

International Search Report and Written Opinion dated Sep. 2, 2010 for PCT Application No. PCT/CN2010/000066 filed Jan. 15, 2010.

International Search Report and Written Opinion dated Sep. 23, 2010 of PCT Application No. PCT/CN2010/070229 filed Jan. 15, 2010.

* cited by examiner

MANUFACTURED WOOD PRODUCT

CROSS-REFERENCE TO RELATED APPLICATIONS

This application claims the benefit and priority to Chinese Patent Application No. 200810149352.8 filed Sep. 19, 2008. The content of the above-referenced application is incorporated herein by reference in its entirety.

BACKGROUND

This disclosure relates to manufactured wood products and methods for using wood material such as byproduct, scrap, processed, discarded wood pieces, and/or other wood material considered generally undesirable or unsuitable for construction and building use.

In recent years, widespread deforestation and unrestrained logging as well as increased demand for wood use has not only reduced the availability of natural wood but also adversely affected the environment. As the demands of construction, building, etc. grow, it is expected that the supply of natural wood will continue to decrease.

This scarcity of natural wood will be felt most keenly in those industries that produce wood products designed for outer surface use where the natural look and texture of a wood grain is the principal appeal of the wood product. For example, in the flooring industry specific species of hardwood are generally more popular and preferred over other species due to a particular wood's natural hardness, density, and, more importantly, distinctive attractive visual appeal. For flooring, preferred hardwoods include maple, red oak, and hickory. Unfortunately, the visual attractiveness of these species has the added effect of increasing demand and depleting the availability of natural raw timber sources sufficient to meet this growing demand.

In addition, a great deal of unused, undesirable, scrap, and/or waste wood material results from the processing of raw lumber into wood products. For example, in the flooring industry, a typical floor board preparation event involves harvesting a large block of raw lumber and slicing the block lengthwise to produce a few hundred pieces of veneer for processing into floor boards. As part of this preparation, it is not uncommon to generate significant amounts of byproduct wood pieces that are considered unusable as flooring material.

Common reasons for generating this byproduct wood material include removal of natural defects such as knots or piths from the lumber by cutting wood pieces from the lumber block; a need to create a smooth flat surface on the lumber block for cutting veneers; or removing a visually unappealing section on the lumber block. This material can be generated at multiple steps during the preparation process, for example, byproduct material is produced while sawmilling logs into rough sawn timbers and further cutting the rough sawn timbers into useable sizes for application. The end result of such wood preparation processes is the production of byproduct wood pieces from highly desirable wood species that are generally never used for any other wood product. Rather, this type of wood material is often discarded and/or burned because any further processing is expensive and economically infeasible. Accordingly, there is a need for a cost effective and efficient method of using natural byproduct wood material, scrap, and/or waste wood pieces to produce a high quality manufactured wood product that provides the visually appealing appearance of natural wood grain as well as natural wood properties.

In the past, the industry has attempted to address this problem by using byproduct wood material such as waste wood or scrap wood to form particle or pressed boards. Particle boards are made by pressing and extruding a mixture of wood chips, wood shavings, or saw dust and an adhesive resin or binder. Because this manufacturing process does not result in a product that looks like real wood, particle boards are typically covered with a wood veneer or painted to have the appearance of natural wood grain. Many methods have been explored, such as the one disclosed in United States Patent Application No. 2002/0179182, to artificially create the look of real wood grain. However, painting and applying an artificial wood grain veneer can become expensive and adds a disincentive for utilizing byproduct wood material in the wood processing industry where it is already too common to burn rather than recycle scrap or waste wood. Accordingly, there is a great need in the wood processing industry for a method of using byproduct wood material to manufacture a wood product that has the appearance of natural wood grain and further provides structural properties similar to that of natural wood.

In addition to using natural byproduct wood material, there is also a need for a method for producing a manufactured wood product using less desirable wood species. Due to the diminishing supplies of popular wood species, focus has now turned to fast regenerating and renewable species that have not been used for construction or building in the past. Such species include the Australian Eucalyptus blue gum, which can be harvested as early as every 10 years. However, blue gum tends to be difficult to work with due to the twisted orientation of its wood grain. Blue gum's wood grain makes it expensive to use the wood for any purpose other than as pulp wood, wood chips, or burning wood. Currently, almost all blue gum is used as pulpwood. In contrast, popular wood species such as the American Chestnut lends itself more easily to multipurpose use for poles, furniture, interior woodwork, and veneer panels. Thus, there is a need for a method for producing manufactured wood product from less desirable wood species where the manufactured wood product has a natural wood grain look and natural wood properties.

In addition to using natural raw wood material, there is also a need for a method for producing a manufactured wood product by using recycled wood material. As the natural supply of raw timber decreases, it will become necessary to recycle and reuse wood pieces that may have had one or more former lives serving as, for example, a board, beam, panel, floor board, etc. in a building. Recycled wood material can come from the demolition of a structure where the wood pieces were once used in the structure but are now left as rubble. In addition to the benefits of wood reuse and recycling, recycled wood pieces also provide a good resource for generating new wood products because this material generally has a longer length than wood material resulting from current wood preparation processes. This is in large part because the forests of previous decades and generations provided taller and wider trees and, therefore, longer raw lumber blocks than the trees available in forests today. Therefore, advantageously, recycled wood pieces may provide a greater starting length for use in producing a manufactured wood product. A greater starting length is particularly important for manufacturing panels where the current industry norm requires a minimum length of about 900 mm (3 feet) to about 1830 mm (6 feet). Recycled wood pieces generally will have this minimum desired length.

In addition, preference for longer boards also comes from an "aesthetic" view. For example, in the wood flooring industry, longer starting wood material results in longer floor boards where the longer boards create less joins in the floor.

Fewer joins, in turn, minimize the interruptions in the flooring pattern and provides the aesthetically desirable appearance of a smoothly connected floor.

Furthermore, using starting material with a longer length also allows for quicker installation of wood board products. Generally, the longer the wood board product then the fewer wood board products needed for a target cover area. This, in turn, reduces the installation time and labor costs because there are fewer boards to install.

Furthermore, there is also a need for a method of producing a manufactured wood product from an assortment or mixture of wood species. For example, because lumber processing locations do not generally segregate byproduct wood materials by species, it is often the case that available supplies of wood materials are mixtures of two or more types of wood. As the natural characteristics of wood can vary greatly from species to species, there can be marked differences between each species' strength, hardness, density, moisture absorptiveness, elasticity, etc. Therefore, there is also a need for a method for producing a visually appealing manufactured wood product that can incorporate a mixture of wood species, while still providing a wood product that exhibits natural wood properties.

Another subject of this disclosure is to provide a manufactured wood product that is manufactured according to the methods described.

SUMMARY

Overcoming many if not all the limitations of the prior art, the present embodiments provide for a method of making a manufactured wood product comprising providing natural wood pieces having a length of at least about 450 mm along the natural grain thereof, cutting wood pieces generally along the wood grain thereof into a plurality of discrete elongated strips; partially separating each elongated strip generally along the wood grain thereof into a plurality of elongate sections, where each of the sections remains in fibrous connection with at least one other section such that the width of the elongated strip remains substantially the same before and after the partially separating step; reducing the amount of moisture in the elongated strips to leave about 12% to 18% of water by weight; applying an adhesive to the strips to form a plurality of adhesive strips; reducing the amount of moisture in the adhesive strips to leave about 8% to 12% of water by weight; providing a plurality of the adhesive strips lengthwise in a mold to fill the mold to a desired height where each strip is substantially the same length and this length is substantially equal to the length of the interior of the mold; and cold pressing the adhesive strips in the mold without heating.

In some embodiments, cold pressing occurs at a pressure from about 10 MPa to 100 MPa. In other embodiments, the cold pressing step further comprises a heating step after pressurizing the mold where the heating temperature is sufficient to substantially cure the adhesive strips. In other embodiments, the heating temperature is between about 120° C. to 150° C.

In further embodiments, the natural wood pieces are a mixture of wood species. In other embodiments, the natural wood pieces are selected from the group consisting of byproduct wood material, scrap wood material, waste wood material, or recycled wood material. In additional embodiments, the natural wood pieces are of a species that is not considered useful for structural or finished wood building materials.

In some embodiments, the elongated strips are air dried in ambient temperature for about 1-48 hours. In other embodiments, the elongated strips are dried in an oven at a temperature from about 45° C. to about 65° C. for about 12-24 hours. In further embodiments, the elongated strips are dried to reduce the moisture content of the elongated strips to about 15% water by weight.

In additional embodiments, applying the adhesive to the elongated strips comprises dipping the elongated strips lengthwise into an adhesive solution comprising phenol, formaldehyde, water, and sodium hydroxide. In other embodiments, the elongated strips are substantially saturated with the adhesive solution before removing the elongated strips from the adhesive solution. In further embodiments, the adhesive solution is at ambient temperature and the elongated strips are placed in the adhesive solution for about 1-10 minutes.

In some embodiments, reducing the amount of moisture in the adhesive strips comprises drip-drying the adhesive strips in ambient temperature. In other embodiments, reducing the amount of moisture in the adhesive strips comprises drying the adhesive strips at a temperature from about 30° C. to about 60° C. In further embodiments, reducing the amount of moisture in the adhesive strips comprises drying the adhesive strips in an oven.

The present embodiments also provide for a method of making a manufactured wood product comprising providing natural wood pieces having a length of at least about 450 mm along the natural grain thereof; cutting the wood pieces generally along the wood grain thereof into a plurality of discrete elongated strips; partially separating each elongated strip generally along the wood grain thereof into a plurality of elongate sections, where each of the sections remains in fibrous connection with at least one other section such that the width of the elongated strip remains substantially the same before and after the partially separating step; reducing the amount of water in the elongated strips to leave about 12% to 18% of water by weight; applying an adhesive to the strips to form a plurality of adhesive strips; reducing the amount of water in the adhesive strips to leave about 8% to 12% of water by weight; providing a plurality of adhesive strips lengthwise in a mold to fill the mold to a desired height wherein each strand is substantially the same length and this length is substantially equal to the length of the interior of the mold; simultaneously applying heat and pressure to the mold sufficient to cure the adhesive strips.

In some embodiments, the method of manufacturing a wood product further comprises removing the manufactured wood product from the mold; slicing wood cuts from the manufactured wood product; and polishing the wood cuts to produce a wood board with a polished look.

In addition, the present embodiments also provide for a manufactured wood product having a natural wood grain appearance prepared by the process described herein.

Furthermore, the present embodiments also provide for a manufactured wood product having a natural wood grain appearance extending throughout the length of the wood product such that the wood product is suitable for use in applications where the grain of the wood product is displayed comprising a plurality of adhesively bonded elongated strips, the strips comprising a natural wood material and adhesive solution with a ratio of 85%-95% natural wood material to about 5%-15% adhesive, the strips having substantially the same length, a width of about 2 cm to 5 cm, and a thickness of about 1 mm to 5 mm; wherein each elongated strip is partially separated into a plurality of elongate sections; a natural wood grain look throughout the length of the wood product formed by a plurality of grain lines from the natural wood material and the orientation of the elongated strips and elongate sections in the wood product; and the manufactured wood product having a moisture content between about 5% to about 30% of water by weight, a hardness between about 16067.7N to about 19638.3N, a dimensional stability from about 0.072% to about 0.088% average change in shape along the grain, a dimensional stability from about 0.063% to about 0.077% average change in shape perpendicular to the grain, a water absorption capacity of about 27% to about 33% by weight, a compressive strength along the grain of about 18.45 MPa to about 22.55 MPa, and a compression strength failure time of about 4.5 minutes to about 5.5 minutes. In some embodiments, the manufactured wood product has an average density of about 1.102 g/cm$^3$.

In some embodiments, the natural wood grain look is further formed by a displacement of a plurality of points along the length of at least one elongated strip. In other embodiments, the displacement of the plurality of points comprises a first point located along the length of the elongated strip and a second point located along the length of the elongated strip, the location of the second point discrete from the first point and the location of the second point directionally displaced from the first point. In another embodiment, the second point is directionally displaced from the first point at a distance between about 1 mm to about 3 cm. In additional embodiments, the second point is directionally displaced from the first point at a distance no greater than the width of the elongated strip.

BRIEF DESCRIPTION OF THE DRAWINGS

The illustrated embodiments are intended to illustrate, but are not intended to be limiting. The drawings contain the following figures.

DESCRIPTION

The following discussion describes in detail several embodiments of manufactured wood products and various aspects of these embodiments. This discussion should not be construed, however, as limiting the present inventions to those particular embodiments. Practitioners skilled in the art will recognize numerous other embodiments including those that can be made through various combinations of the aspects of the illustrated embodiments.

The term "manufactured wood product," as used herein, is a broad term used in its ordinary sense, which may include any type of man-made or machine-made wood item, such as, for example, engineered wood boards, wood-containing composite boards, fiberboards, oriented strand boards, particle boards, or any other similar pieces that contains wood matter.

The term "byproduct" refers to any wood material resulting from processing raw timber. This includes, for example, wood pieces resulting from debarking, trimming, sawmilling, shaving, cutting, slicing, and/or otherwise preparing raw timber from trees into wood products.

Turning now to the drawings provided herein, a more detailed description of the embodiments of the present invention is provided below.

Figure 1:
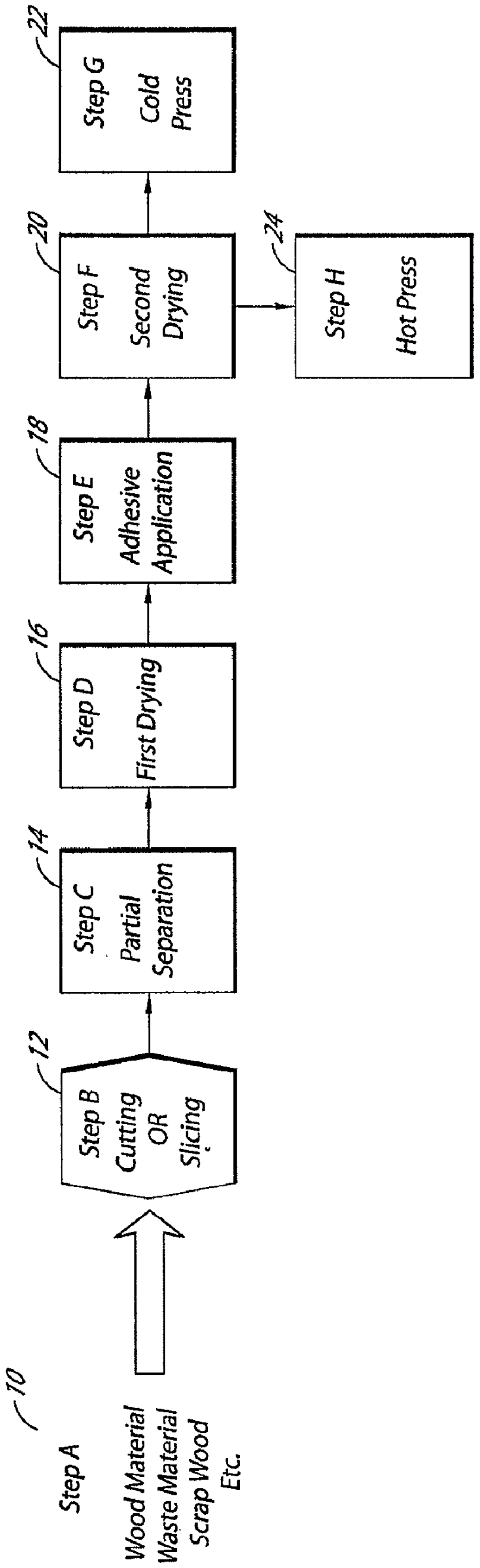
FIG. 1 is a process chart illustrating a series of steps for one embodiment of the present invention.

FIG. 1 shows a process chart illustrating a series of steps for one embodiment of a method for producing a manufactured wood product. In Step A 10, wood material such as byproduct wood pieces, recycled wood, waste wood, and/or scrap wood is selected and/or gathered for producing a manufactured wood product. Preferably, the wood pieces have a minimum length from about 450 mm, a minimum width from about 3 cm, and a minimum thickness from about 1 mm. Preferably, the wood material comprises wood sheets having a thickness about 3 mm, a width between about 3 cm to about 5 cm, and a length of at least about 450 mm.

In further embodiments, the selection and/or gathering of wood pieces is done manually whereby the available wood pieces are chosen based on characteristics such as, for example, the size or shape of the wood pieces. In other embodiments, the wood material is selected by machine and may be done so through an automated process.

In addition, it is understood that the examples of wood pieces provided are not intended to be limiting and that any material containing natural wood may be used. For example, the wood material may come in various shapes, sizes, and forms including slabs, sheets, strands, veneers, and/or slats. Moreover, the wood material may be a byproduct of a wide range of processing procedures. In addition, the wood material may arise from a variegated array of species including highly desirable hardwood species as well as less desirable species. In some embodiments, the wood material may be a mixture of two or more wood species where the mixture is, for example, an assortment of both hardwoods and softwoods.

Figure 2A:
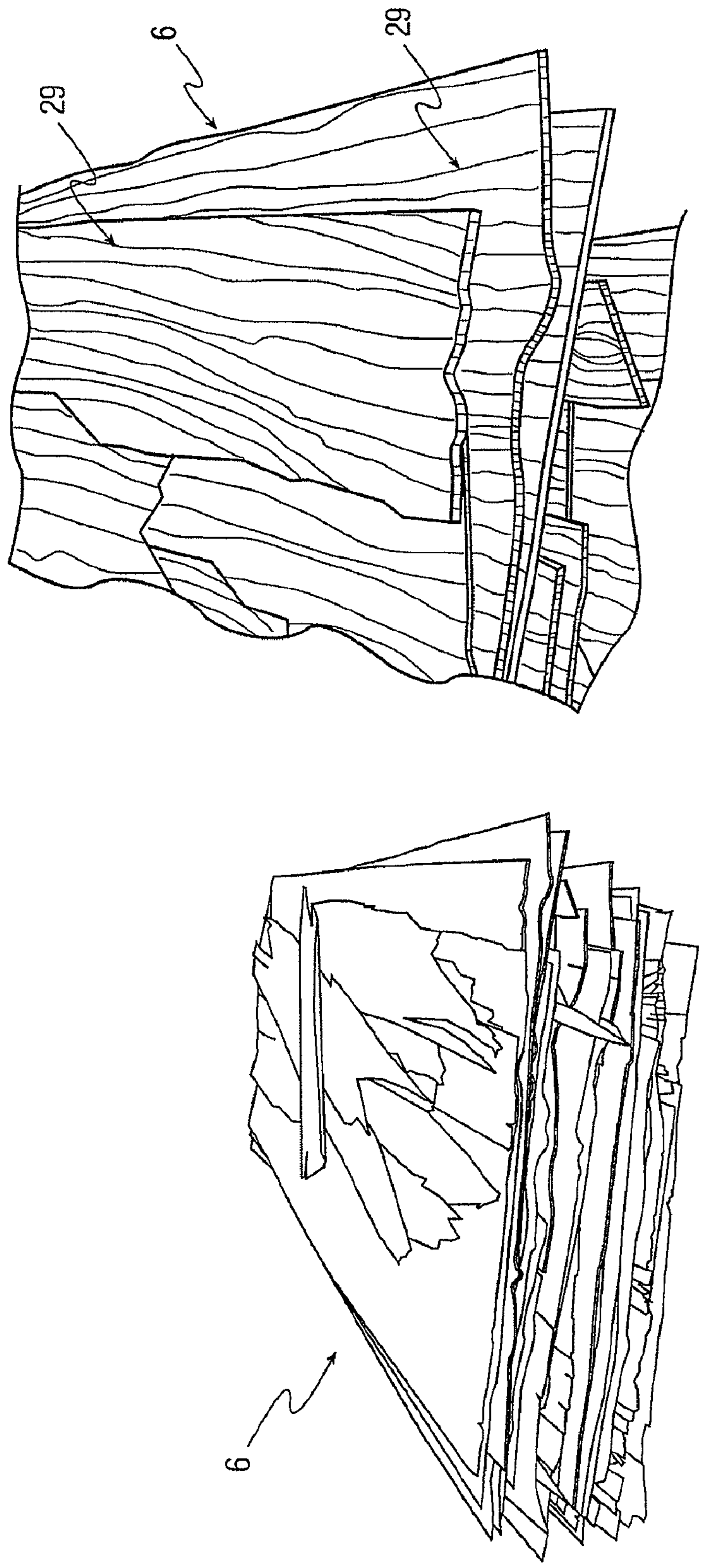
FIG. 2A depicts waste wood from a flooring preparation plant.

In further embodiments, the wood material is of type where using the particular wood material for wood chips or burning wood is the most cost effective use of the material. By way of example, FIG. 2A illustrates one embodiment where the wood material is from a flooring preparation plant and the wood material comes in an assortment of thin sheet-like pieces 6. In the flooring industry, the flooring preparation process often generates a great deal of scrap wood when veneers are sliced and peeled from lumber blocks. Typically, the raw timber must be debarked and then sawn or cut into a fitch from which veneers are then sliced. As part of this process, it may be necessary to cut or shave some portion of the log or lumber block to create a suitable surface for veneer slicing. This pre-slicing process can generate long flat sheets of wood material which can, for example, have a length from about 800 mm to 2200 mm, a width about 800 mm, and a thickness about 3 mm. (See FIG. 2A.) This wood material is generally not desirable for further processing into flooring and is considered byproduct, scrap, or waste wood by the flooring industry. Additionally, it is usually not cost effective for the flooring industry to attempt to process this byproduct material into any wood product other than wood chips or burning wood. However, in one embodiment, this wood material can be selected in Step A and utilized to produce a manufactured wood product such as a manufactured floor board.

Similarly, in another embodiment, the wood material is from a less desirable wood species for which the cost effective use of the wood material is for wood chips or burning wood. For example, in the case of Eucalyptus blue gum, this species has not been used widely because the wood grain makes the wood difficult to work with. It is common for the lumber industry to use blue gum primarily for wood chips that are destined for burning. However, wood material from species such as blue gum may be used to manufacture a wood product, such as flooring, where the species would not generally be used to create such a wood product.

Figure 2B:
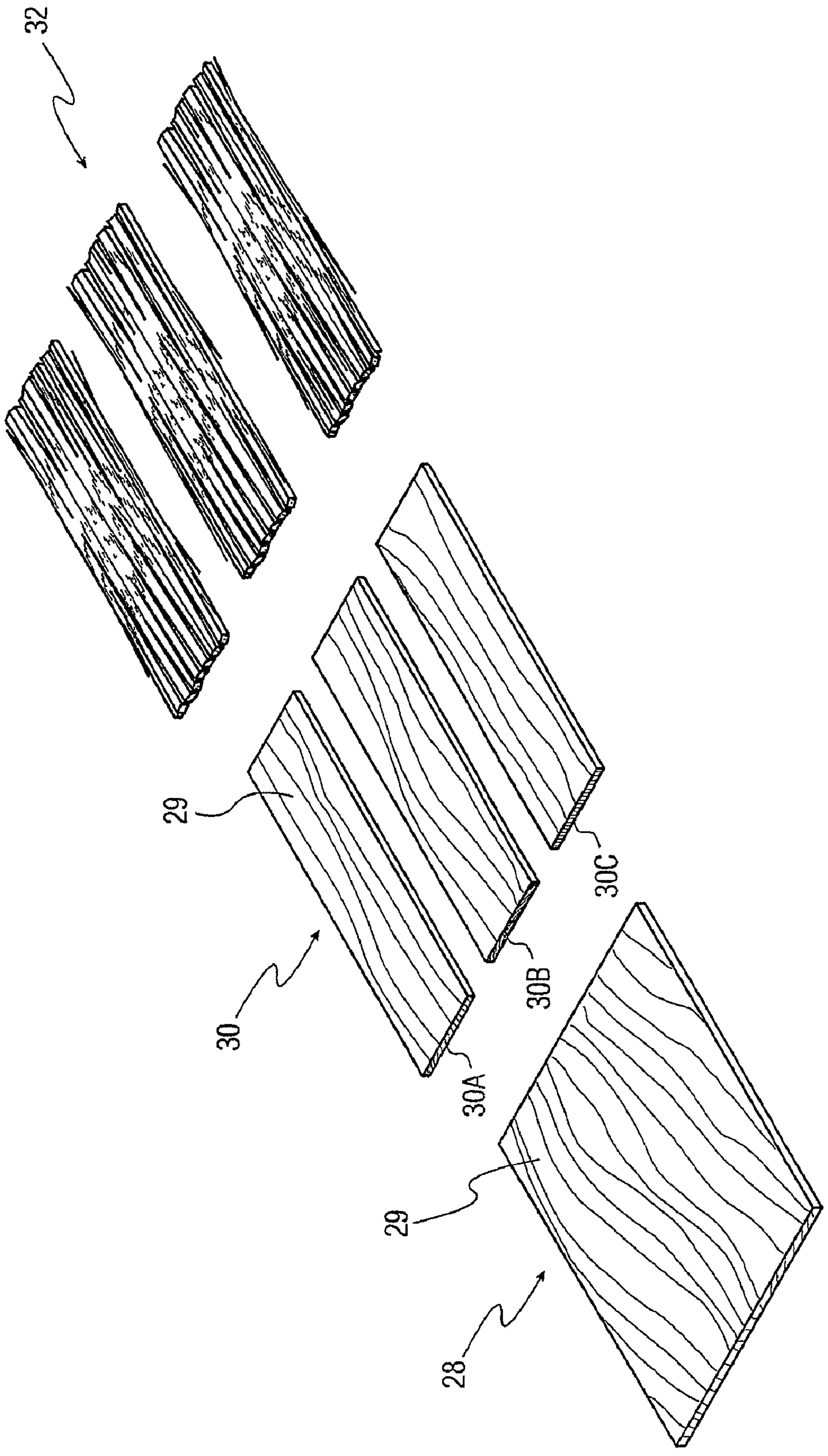
FIG. 2B is a schematic of one embodiment of the present invention for cutting a wood piece into elongated strips and then partially separating the elongated strips into a plurality of elongate sections.

In Step B 12, as shown in FIG. 2B, the selected wood materials and/or pieces are cut along a natural wood grain 29 of the wood piece 28 into a plurality of discrete elongated strips 30. (See also FIG. 2A). In one embodiment, the wood pieces 28 are cut into discrete elongated strips 30 having a thickness between about 2 mm to about 5 mm, a length from at least about 450 mm, and a width between about 3 cm to about 5 cm. Preferably, the discrete elongated strips have a thickness of about 3 mm, a width of about 3 cm, and a length from at least about 450 mm. FIG. 2B illustrates one embodiment where a wood piece 28, in sheet form, is cut into three discrete elongated strips 30A-C where the discrete elongated strips are separated fully from each other.

Although a wood sheet is shown in FIG. 2B, it is understood that the wood material used may be of any size, shape, or form. Accordingly, Step B further includes any preliminary trimming, shaving, slicing, or preparation a wood piece may undergo in order to prepare the wood piece for cutting into discrete elongated strips. In another embodiment, Step B further includes trimming and/or cutting the discrete elongated strips such that each of the discrete elongated strips has substantially the same length. In some embodiments, each of the discrete elongated strips has a length of about 900 mm to about 4250 mm In another embodiment, each of the discrete elongated strips has substantially the same length, wherein the length is selected from a range from about 900 mm to about 4250 mm.

The cutting process of Step B can be accomplished in any number of ways as is well known in the art. For example, a wood piece 28 may be cut manually into elongated strips 30 by a human operator using a slicing tool such as a saw or clippers. In another embodiment, a wood piece 28 can be sliced into elongated strips 30 by a machine process such as by frame saw or multiple blade circular saw.

In Step C 14, as shown in FIGS. 2B-3C, the plurality of discrete elongated strips 30 is partially separated along a natural wood grain 29 into a plurality of elongate sections 32, wherein each of the elongate sections 32 maintains a fibrous connection 33 with at least one other elongate section. In some embodiments, the fibrous connection 33 is formed by a cellulosic and/or lignocellulosic linkage between the elongate sections. For example, in FIGS. 2B-3B a discrete elongated strip 30 is partially separated into a plurality of elongate sections 32A-G. The elongate sections exhibit connectivity with one another through fibrous connections 33. FIG. 3A shows the partially separated elongate sections 32A-G and FIG. 3B provides a cross-sectional view of the elongate sections 32A-G taken along line 3B. Between the elongate sections 32A-G are fibrous connections 33 formed by a cellulosic and/or lignocellulosic attachment(s) that maintain connectivity between the elongate sections. "Cellulosic" and "lignocellulosic" are broad terms used in the ordinary sense to refer to the constituents of plants, which include cellulose, lignin, or hemicellulose.

Figure 3A:
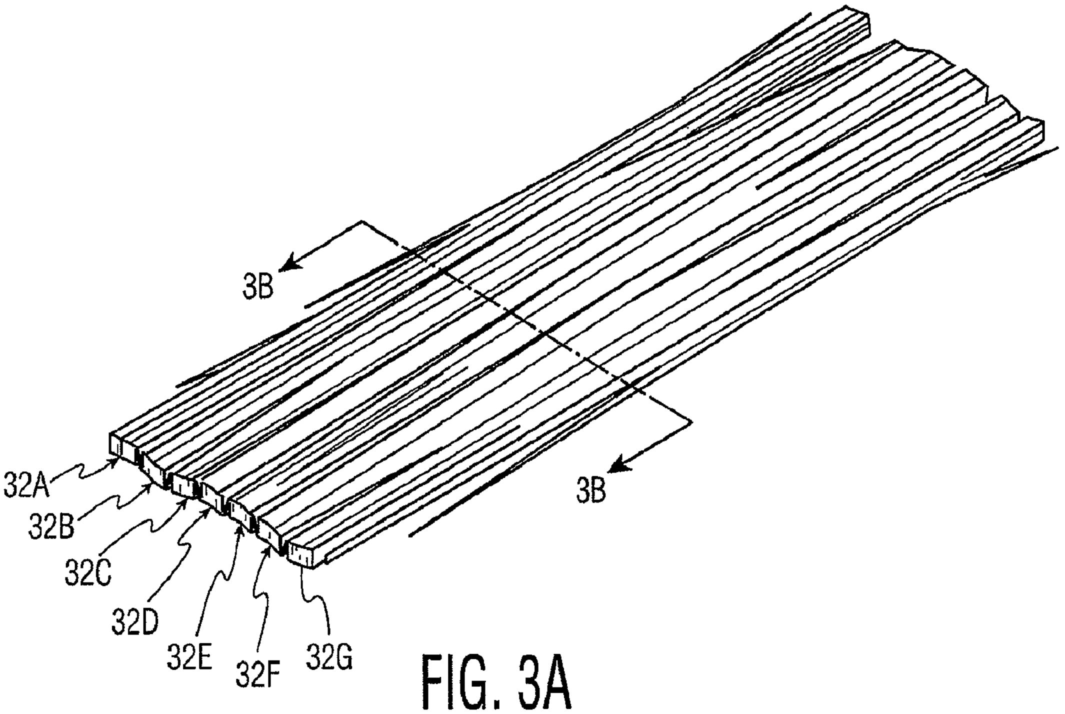
FIG. 3A depicts a perspective view of the wood piece of FIGS. 2A-B that has been cut into elongated strips and partially separated into a plurality of elongate sections.
Figure 3B:
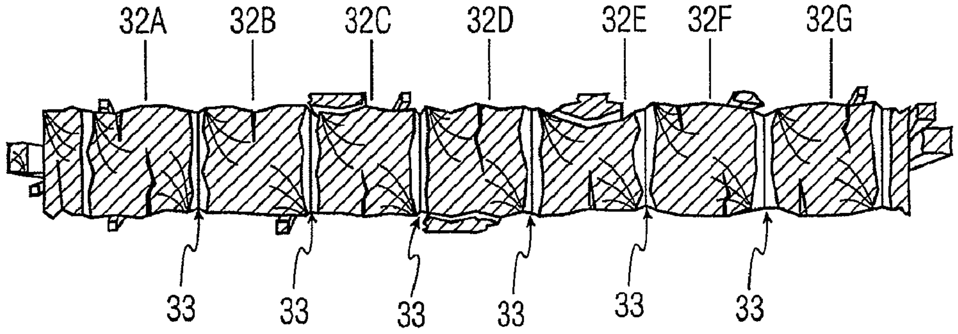
FIG. 3B depicts a cross-sectional view of one end of an elongated strip having a plurality of elongate sections from FIG. 3A.
Figure 3C:
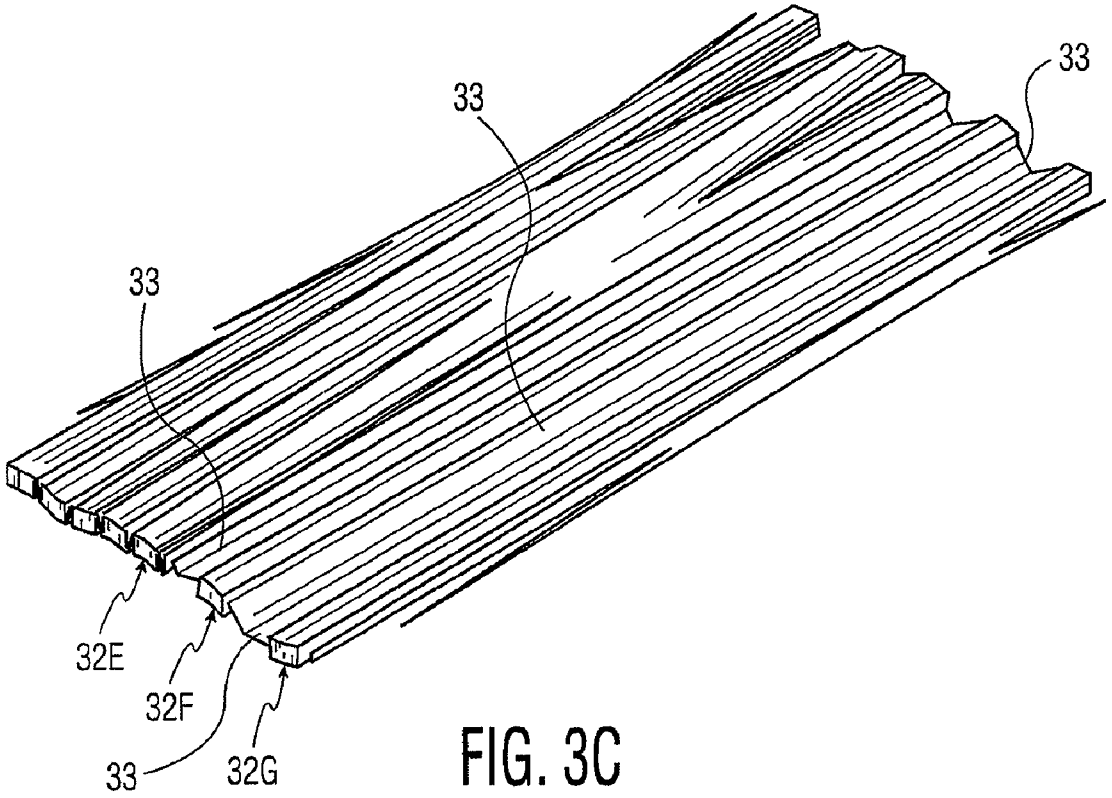
FIG. 3C depicts a perspective view of the wood piece of FIG. 3A where three of the elongate sections are pulled apart to show the fibrous connectivity between the elongated sections.

In some embodiments, the fibrous connection 33 is formed by more than one point of attachment between at least two elongate sections. For example, FIG. 3C provides a perspective view of the elongated strip of FIG. 3A where elongate sections 32E-G are pulled apart horizontally to show the fibrous connectivity 33 between the elongate sections. In this embodiment, an individual elongate section may maintain multiple fibrous connections 33 with at least one other elongate section.

Preferably, the discrete elongated strip 30 is partially separated into a plurality of elongate sections, wherein each of the elongate sections 32 maintains a fibrous connection 33 with at least one other elongate section such that the width of the elongated strip remains substantially the same before and after the partially separating step. For example, it is preferable for a discrete elongated strip having a width of about 3 cm before the partial separating step to have substantially the same width of about 3 cm afterwards. Without being bound by any theory, it is believed that maintaining fibrous connectivity between the plurality of elongate sections preserves the integrity of the overall form and shape of the elongated strip such that the width of the elongated strip is substantially preserved before and after the partially separating step. In further embodiments, it is preferable that the width and length of the elongated strip remain substantially the same before and after the partially separating step.

Generally, in some embodiments, a large number of elongated strips and elongate sections will be cut and crushed for use in producing the manufactured wood product. For example, in a manufactured wood product such as a floor board with a length about 3 ft, width about 4 inches, and height about 0.5 inches, there are about 7 to about 12 elongate sections present for every square inch of the board. In other embodiments, there may be about 10 to about 200 elongate sections present for every square inch of the manufactured wood product. In further embodiments, depending on the width and size of the elongate sections, there can be greater than about 200 elongate sections or less than about 7 elongate sections per square inch of the manufactured wood product.

Figure 4:
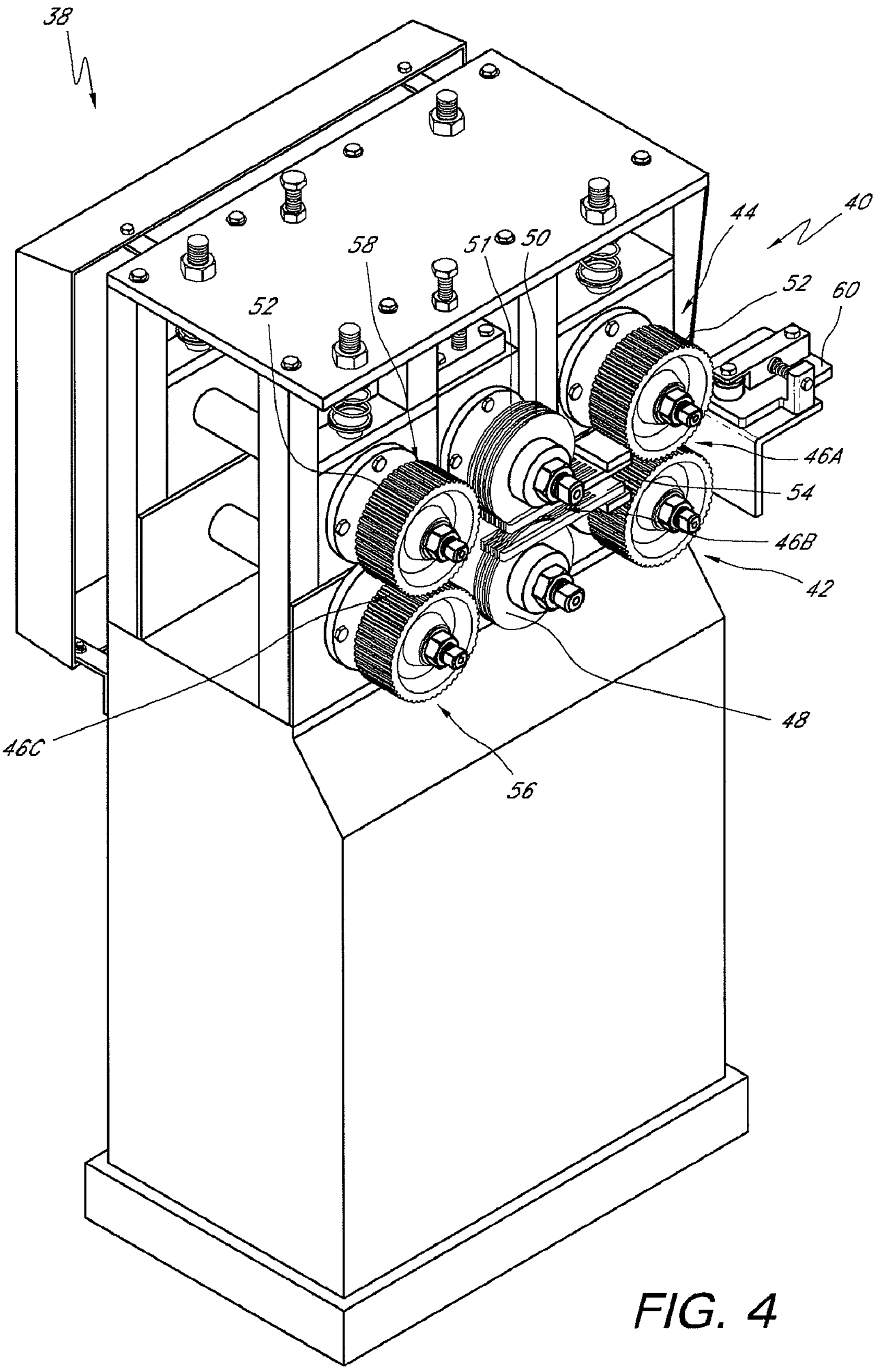
FIG. 4 illustrates an exemplary crushing machine capable of partially separating the elongated strips into a plurality of elongate sections.

The partially separating step may be accomplished by crushing, slicing, cutting, or any other suitable means. In one embodiment, partial separation is accomplished by use of a crushing machine 38 as illustrated in FIGS. 4-6D. FIG. 4 depicts an exemplary crushing machine 38 having a first pair of rollers 42, 44 disposed at a first end 40 of the crushing machine 38 where the first pair of rollers 42, 44 has a first roller 42 and a second roller 44. As shown, the first roller 42 is aligned vertically under the second roller 44 such that the first roller 42 and second roller 44 define a portion of a path 46A located along the longitudinal axis between the first roller 42 and second roller 44. In some embodiments, the first and/or the second roller further comprises a teethed outer surface.

The crushing machine of FIG. 4 further includes a second pair of rollers 48, 50 disposed adjacent to said first pair of rollers 42, 44. The second pair of rollers 48, 50 having a third roller 48 and a fourth roller 50 wherein the third roller 48 is axially aligned with the first roller 42 and the fourth roller 50 is axially aligned with the second roller 44. The third roller 48 is aligned vertically under the fourth roller 50 such that the third roller 48 and fourth roller 50 define a portion of a path 46B located along the longitudinal axis. In one variation, the first pair of rollers 42, 44 and second pair of rollers 48, 50 define distinct portions of the same path along the longitudinal axis. In some embodiments, the third and/or the fourth roller further comprises a teethed outer surface. In further embodiments, the third and/or fourth roller comprises flanges 54 located parallel to the longitudinal axis. In some embodiments, the flanges guide the elongated strip into the second pair of rollers 48, 50 as the strip exits the first pair of rollers 42, 44.

In FIG. 4, the crushing machine further comprises a third pair of rollers 56, 58. The third pair of rollers 56, 58 having a fifth roller 56 and a sixth roller 58, wherein the fifth roller 56 is axially aligned with the third roller 48 and the sixth roller 58 is axially aligned with the fourth roller 50. The fifth roller 56 is aligned vertically under the sixth roller 58 such that the fifth roller 56 and sixth roller 58 define a portion of a path 46C located along the longitudinal axis. In some embodiments, the third pair of rollers, the first pair of rollers, and the second pair of rollers independently define distinct portions of the same path along the longitudinal axis. In some embodiments, the fifth and/or the sixth roller further comprises a teethed outer surface.

As shown in FIGS. 6A-D, the partially separating step of Step C may be carried out by feeding the elongated strip 30 lengthwise into the first end of the crushing machine 40 through a path 46A along the longitudinal axis defined by the first 42 and second 44 rollers. In some embodiments, the first 42 and second 44 rollers comprise teeth 52 disposed on an outer surface of a roller to facilitate the movement of the elongated strip through the path 46A.

Figure 5:
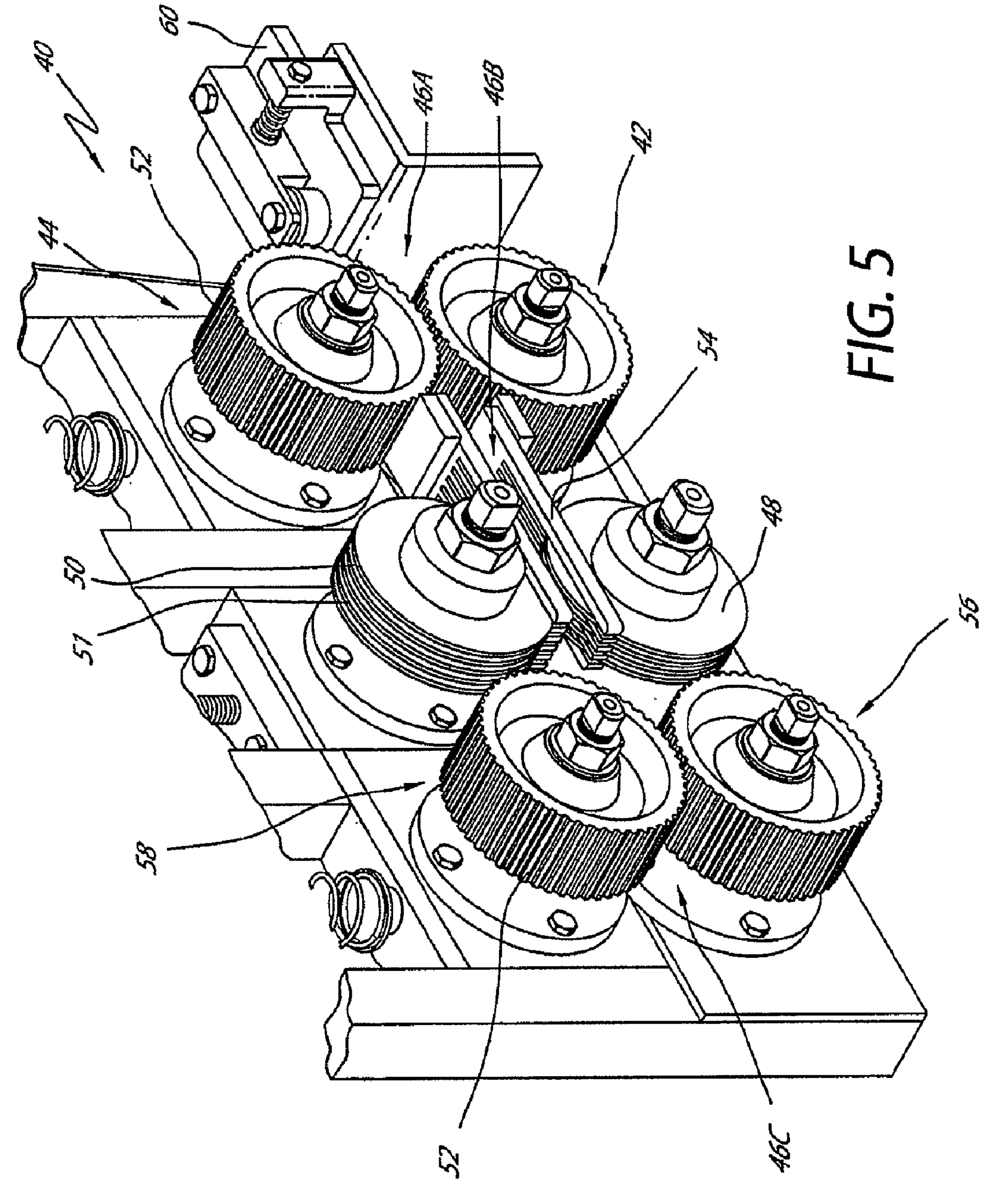
FIG. 5 illustrates three pairs of rollers present on the crushing machine depicted in FIG. 4.
Figure 6A:
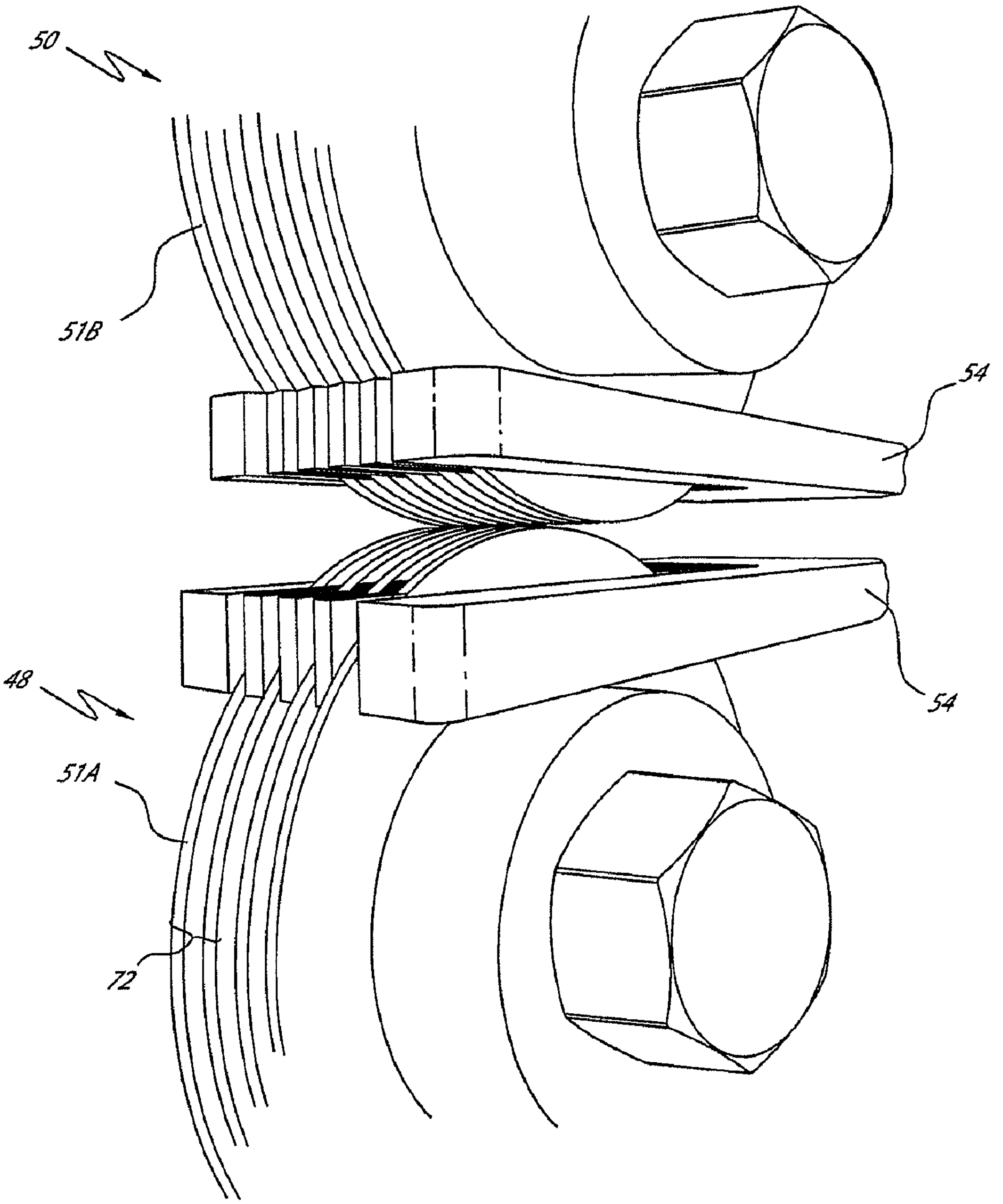
FIG. 6A illustrates the second pair of rollers on the crushing machine depicted in FIG. 5.
Figure 6B:
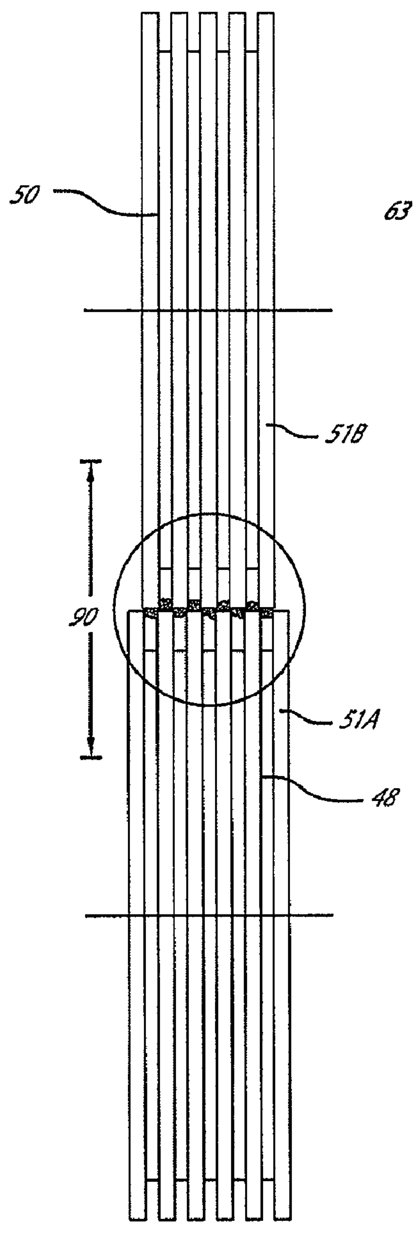
FIG. 6B illustrates the junction between the third and fourth rollers on the crushing machine of FIG. 5.
Figure 6C:
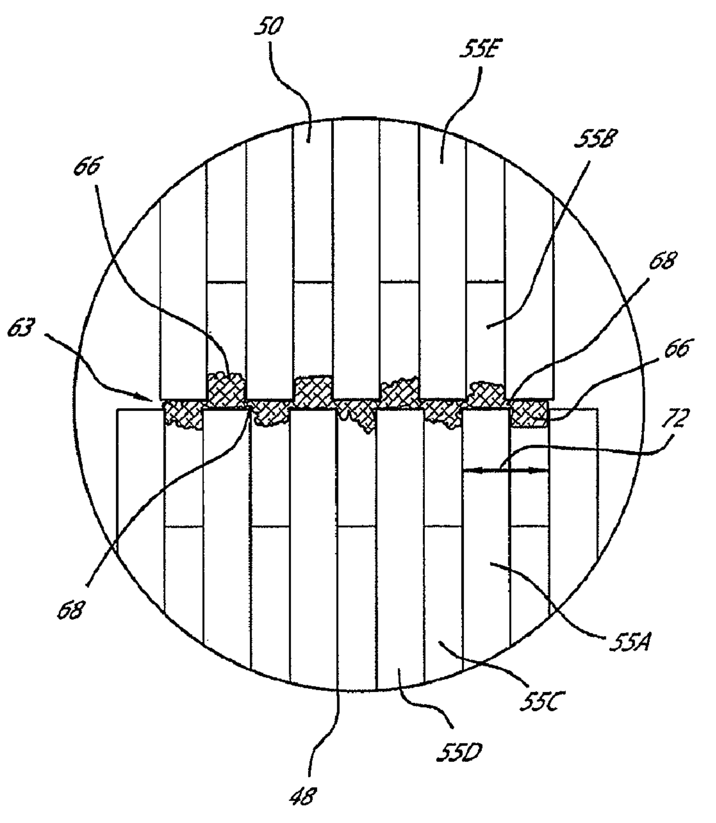
FIG. 6C is an enlarged view of FIG. 6B.
Figure 6D:
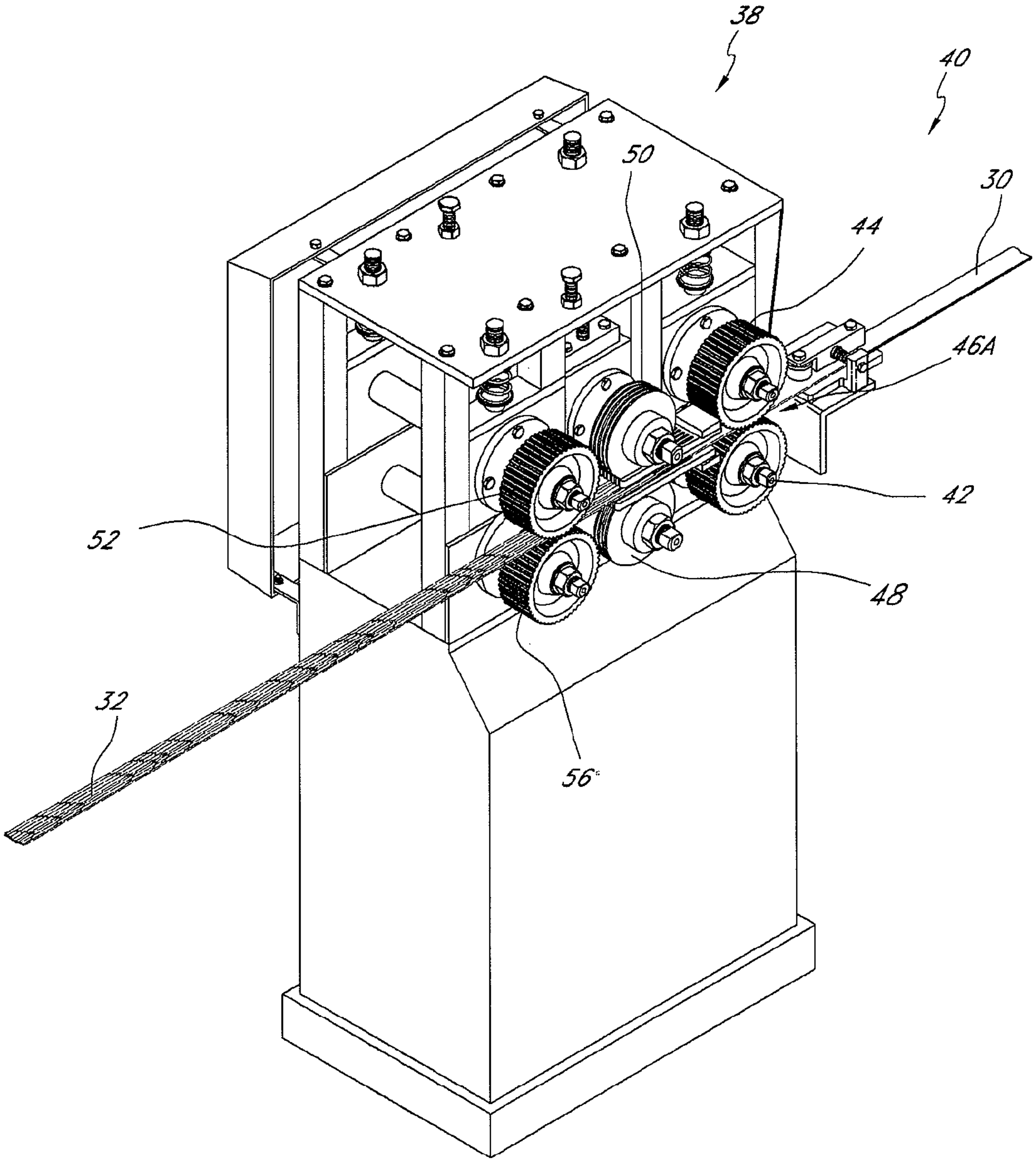
FIG. 6D depicts one embodiment of the present invention where partially separating the elongated strip into a plurality of elongate sections is done by the crushing machine of FIG. 4.

In some embodiments, the height of the path 46A between the first 42 and second 44 roller is less than the thickness of the elongated strip such that as the elongated strip is fed lengthwise through the path, the outer surface of the first and second roller comes into contact with the elongated strip and applies a pressing or crushing force against a top and bottom surface of the elongated strip. Preferably, the crushing machine may further comprise an alignment ledge 60 to spatially align the elongated strip to path 46A as it is fed through the first pair of rollers 42, 44 and into path 46A Once fed through the first pair of rollers 42, 44, the elongated strip contacts the second pair of rollers 48, 50. As shown in FIGS. 5-6C, the second pair of rollers 48, 50 comprises a teethed surface wherein a plurality of teeth 51A-B is disposed radially along an outer surface of the third 48 and fourth 50 rollers. Preferably, a first set of teeth 51A is located on the third roller 48 and is off-set from a second set of teeth 51B located on the fourth roller 50 such that the first set 51 A does not completely interlock with the second set 51B when fully engaged. FIGS. 6B-C illustrate the junction 90 between the two sets of teeth 51A-B. As shown in FIG. 6C, by way of example, the third roller 48 and a fourth roller 50 have teeth 55A-E located on an outer surface of the roller. Teeth 55B and E are disposed on fourth roller 50 and teeth 55A, C, and D are disposed on third roller 48. The darkened portions 63 illustrate the cross-section of an elongated strip as it is fed and crushed between the rollers 48 and 50.

As an elongated strip is fed lengthwise through the third 48 and fourth 50 rollers, the teeth 55A-E grip a top and bottom surface of the elongated strip while simultaneously applying a pressing and crushing force to both surfaces. However, because the teeth 55A-E do not fully interlock, the teeth 55A-E do not apply sufficient force to fully separate the elongate strip into discrete elongate sections. Rather, as shown in FIG. 6C, the off-set arrangement of the teeth 55A-E splits the elongated strip into elongate sections 66 which maintain a fibrous connectivity 68 between the elongate sections 66.

In addition, a width 72 between each tooth on a roller may also be adjusted and varied according to the desired width of the elongate sections. For example, the tooth 55A may be adjusted to enlarge or reduce the width 72 between teeth 55A and 55C thereby also varying the width of an elongate section formed from passing through teeth 55A and 55C. Preferably, the width of the elongate sections will range from about 1 mm to about 5 mm. More preferably, the width of the elongate sections will range from about 2 mm to about 3 mm. In some embodiments, the width of the elongate sections will be between about 1 mm and about 1 cm.

After passing through the second pair of rollers 48, 50, the elongated strip is fed lengthwise through the third pair of rollers 56, 58 through a path along the longitudinal axis defined 46C by the fifth 56 and sixth 58 rollers. The elongated strip then exits from a back end of the crushing machine 38. The third pair of rollers 56, 58, as shown in FIG. 5, may comprise teeth 52 disposed on an outer surface of a roller to facilitate the movement of the elongated strip through the path. In some embodiments, the height of the path between the fifth 56 and sixth roller 58 is less than the thickness of the elongated strip such that as the elongated strip is fed lengthwise through the path, the outer surface of the fifth 56 and sixth 58 roller comes into contact with the elongated strip and applies a pressing or crushing force against a top and bottom surface of the elongated strip.

Although the crushing machine is described herein as the embodiment depicted in FIGS. 4-6D, it is understood that any suitable separating device, machine, or other separating means may be used to partially separate the elongated strips into elongate sections having a fibrous connection with at least one other elongate section. In terms of crushing machines, other embodiments could include, for example, those having variations in the number of rollers, arrangement of the rollers, or the location and character of teethed surfaces.

In Step D 16, the partially separated elongated strips are dried to reduce moisture content. Drying can occur by any number of well known methods in the art, including air drying and oven drying. Preferably, the elongated strips are dried to leave about 12% to about 18% of water by weight. More preferably, the elongated strips are dried to leave about 14% to about 15% water by weight. The moisture content may be determined by using methods well known in the art such as, for example, the use of a hand-held moisture meter or by weighing the difference in mass between the elongated strip before and after the drying step. Drying is an important step of this process because natural wood tends to shrink, swell, and change form depending on humidity and moisture content. Drying wood minimizes these changes.

In Step E 18, an adhesive is applied to the dried elongated strips. Any suitable adhesive may be employed where the selected adhesive can provide a bond between wood materials. Examples of such adhesives include but are not limited to resorcinol-formaldehyde, melamine-formaldehyde, phenol-formaldehyde, phenol-resorcinol-formaldehyde, and isocyanate. Preferably, the adhesive is water-resistant and has high water solubility. High water solubility is believed to aid the permeation of the adhesive through wood material. Preferably, the adhesive is phenol formaldehyde. More preferably, the adhesive is a formulation of phenol, formaldehyde, water, and sodium hydroxide. Other suitable adhesives also include those discussed in Forest Products Laboratory, 1999. *Wood Handbook—Wood as an Engineering Material,* Chapter Nine "Adhesive Bonding of Wood Materials, Vick, Charles, Gen. Tech. Rep. FPL-GTR-113. Madison, Wis. U.S. Department of Agriculture, Forest Service, Forest Products Laboratory (1999). Preferably, the adhesive is applied such that the ratio of natural wood material to adhesive is about 85%-95% natural wood material to about 5%-15% adhesive.

To apply the adhesive, any suitable method or means may be employed. For example, adhesives may be applied by hand, brush, spray, roller, by machine, and/or curtain coater. In some embodiments, the adhesive is applied by dipping the elongated strips lengthwise in a bath of adhesive until the strips are substantially coated with an adhesive layer. In other embodiments, the elongated strips are submerged in an adhesive until the strips are substantially saturated with the adhesive.

In Step F 20, the adhesive laden or covered elongated strips or "adhesive strips" are dried a second time to reduce moisture content. The second drying can occur by any number of well known methods in the art, including air drying and oven drying. In some embodiments, these adhesive strips are drip-dried to remove excess adhesive. In other embodiments, where the adhesive is in liquid form, the second drying may solidify the adhesive by reducing the moisture content present. Preferably, these covered strips are dried to leave about 8% to about 12% of water by weight. More preferably, these elongated strips are dried to leave about 6% to about 12% water by weight. The moisture content may be determined by using methods well known in the art such as, for example, the use of a hand-held moisture meter.

Figure 7:
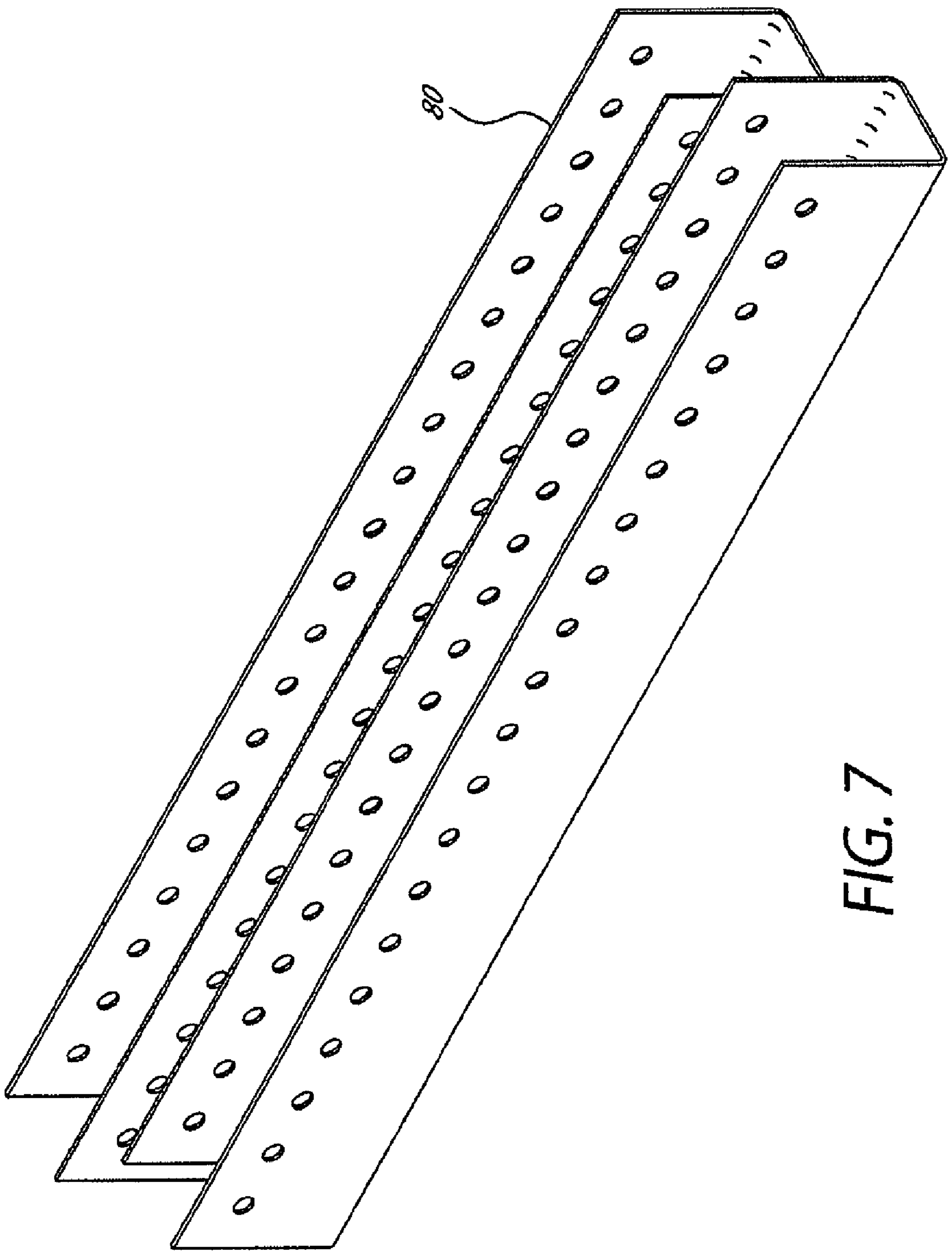
FIG. 7 illustrates a mold for the cold press step for one embodiment of the present invention.
Figure 8:
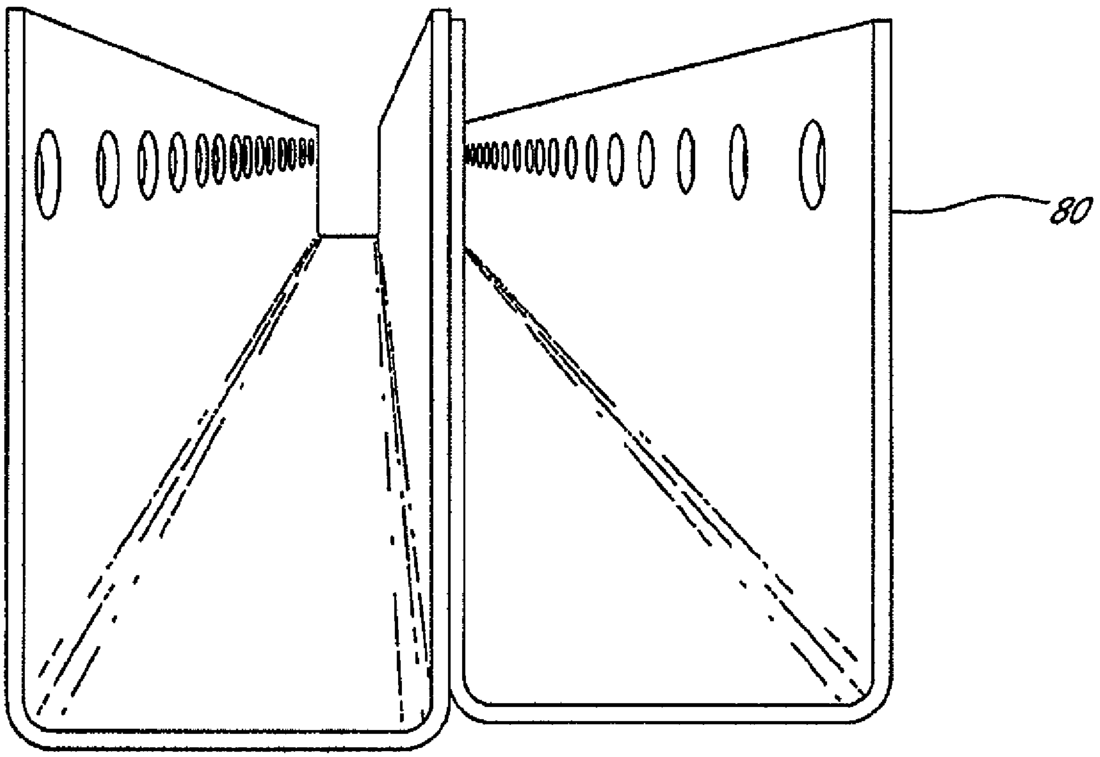
FIG. 8 is a perspective view of the mold shown in FIG. 7.

In Step G 22, the adhesive strips are cold pressed to form a manufactured wood product. In Step G, the adhesive strips are randomly loaded lengthwise into a mold. FIGS. 7-8 depict an exemplary mold 80 that is suitable for the cold press step. As shown, the cold press mold 80 is rectangular in shape with a length greater than its width. Although the mold presented in FIGS. 7-8 is rectangular, it is understood that any suitable mold known in the art, such as a square mold or a panel mold, may be used for this process. In some embodiments, the cold press mold is selected to have a length in a range from about 900 mm to 1850 mm. In other embodiments, the mold length may be between about 900 mm and 4250 mm.

To load the mold 80, adhesive strips are placed lengthwise in the mold 80. The height of the loaded strips may be less than, greater than, or substantially the same as the height of the mold 80. Preferably, the mold 80 is loaded until the height of the loaded strips is significantly higher than the height of the mold 80. This ensures the use of the mold's maximum capacity as well as a tighter packing and stacking of the strips in the mold 80. In some embodiments, the height of the loaded strips exceeds the height of the mold to a factor of 2:1. Without being bound to any theory, it is believed that the ratio of the loaded adhesive strips to the compressed material should preferably be no less than 2:1. More preferably, the ratio of loaded adhesive strips to compressed material should be about 2:1 to about 3:1. In further embodiments, the ratio will depend on characteristics such as the density of the natural wood material used. Generally, the pressing step will compact and compress the loaded strips together so that the resulting material will have a lower height than the unpressed stacked loaded strips.

Preferably, the adhesive strips are pressed into the mold such that any height difference does not affect the shaping and molding of the manufactured wood board. For example, in some embodiments, the height of the loaded strips may exceed the mold height up to about 100 cm, but when the loaded strips are pressed, the strips are pressed fully into the mold cavity such that the resulting manufactured wood product will have a height that will not exceed the height of the mold 80. In other embodiments, a channeling chute may extend from the mold 80 to a desired height above the mold where the channeling chute maintains the arrangement, stacking, and/or orientation of the adhesive strips that are positioned above the height of the mold. Such channeling chute may be parallel with the top edges of the mold or otherwise align with the mold so that the channeling chute maintains the orientation and arrangement adhesive strips above the mold before and during pressing.

In other embodiments, the height of loaded strips may be determined by the desired thickness of the pressed manufactured wood product. For example, if the desired thickness of a manufactured wood product is 15 cm but the mold used has a height of 40 cm, the mold may be filled up to less than its full height in order to achieve the desired thickness of the pressed product. However, in other embodiments, the height of loaded strips may exceed the height of mold 80 prior to pressing, however, once pressed; the manufactured wood product may have a desired height less than the full height of the mold.

Preferably, the strips are selected to have a minimum length that is substantially the same length as the mold 80. More preferably, the strips are selected to have a minimum length such that the lengths of the strips substantially span the entire length of the mold. For example, if the mold 80 has a length of 1.9 m, then the strips loaded into the mold should be selected to have a length approximately the same as 1.9 m. This is desirable to promote content uniformity throughout the full length of mold 80. For example, having a portion in mold 80 where there are shorter strips could cause structural weaknesses in a resulting manufactured wood board.

In another embodiment, the adhesive strips are selected to have a length that is not equal to the length of the mold. For example, the length of the mold may be 200 cm long but the minimum length of the adhesive strips is 191 cm. In this embodiment, high pressurization from the cold process step causes the adhesive strips to expand in the mold. In this example, the 9 cm length difference provides space for the adhesive strips to expand into once the loaded mold is cold pressed. In this embodiment, it is preferable to have the adhesive strips substantially span the length of the mold such that the length of the strips is shorter than the length of the mold and thus allows the strips some space to expand into when cold pressed in the mold. The exact length difference differs from mold to mold and upon factors such as the amount of strips and adhesive present in the loaded mold.

Once the adhesive covered strips are loaded into the mold 80, the strips are evened and leveled so that the ends of the strips are fully placed in the mold. For example, a user may manually move the strips in the load so that all the strip ends are in the mold. Additionally, the user may use a leveling tool such as a flat piece of metal with a handle to a push all the strips down into the mold and to make sure that all the ends are at an even length within the mold.

Once the mold is loaded and the strips are leveled, a non-heated press is applied to the loaded mold. Any suitable pressing apparatus, device, and/or means may be employed to apply pressure without heat to the elongated strips loaded in mold 80. Pressurization serves many purposes including forcing trapped air out of the loaded mold, creating additional molecular contact between wood surfaces, and forcing the adhesive to penetrate into the wood structure for more effective mechanical bonding. Generally, in the cold press operation, a loaded mold is placed in a hydraulic press and subjected to pressure of approximately 10-100 MPa. Varying suitable pressures may be used according to the size and shape of the mold, the properties of the wood material, and the selected adhesive.

Figure 9:
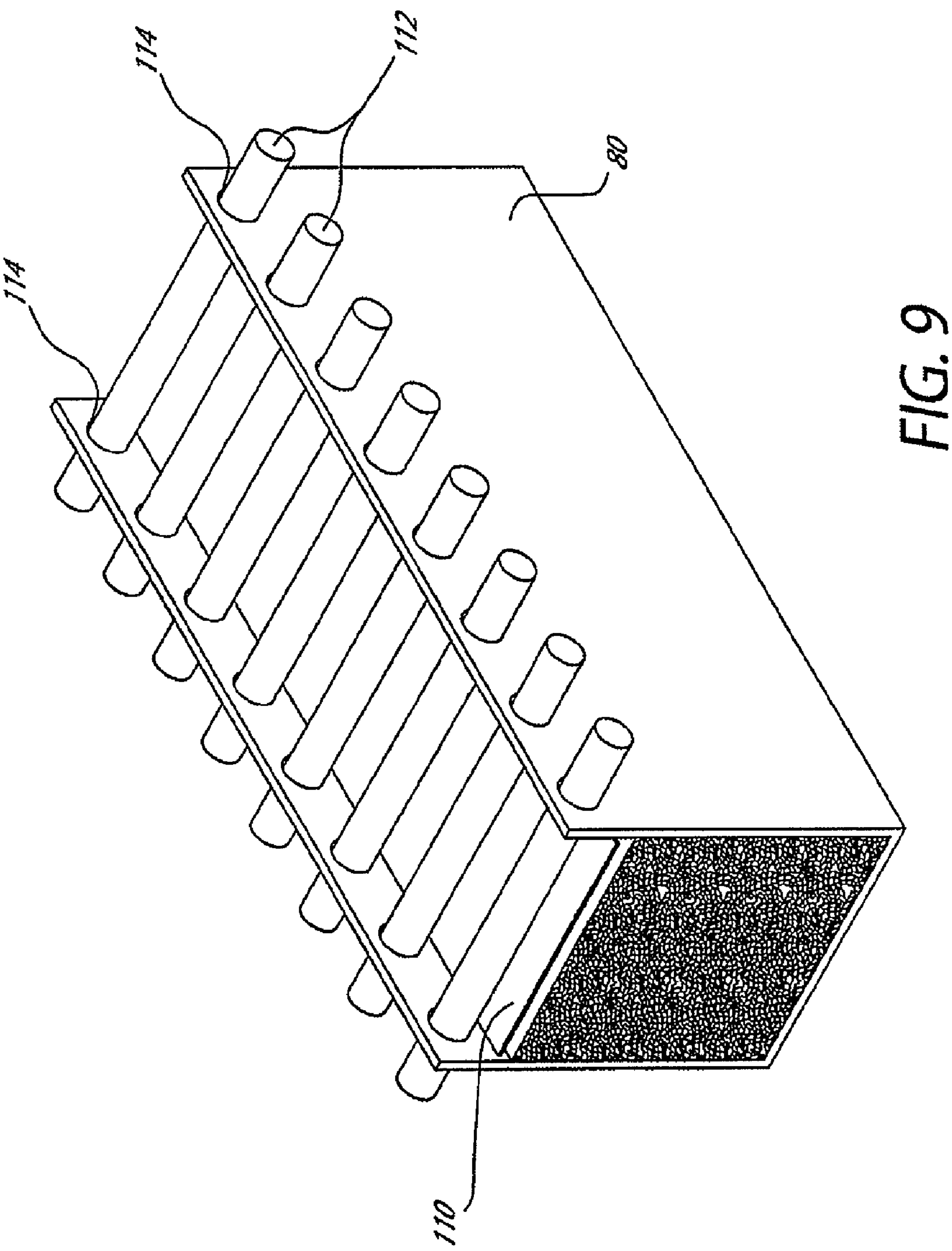
FIG. 9 is a schematic of a mold with clamp for an embodiment of the present invention.

Once pressurized, the loaded mold is removed from the pressurizing source, and suitable clamps are applied to the mold to maintain pressure until the elongated strips are substantially bonded. FIG. 9 depicts exemplary clamps suitable for maintaining the pressure over the mold 80 and the elongated strips. In FIG. 9, a metal sleeve 110 having substantially the same width and length as the loaded mold 80 is placed over a top surface of the elongated strips. In this embodiment, a plurality of cylindrical pins 112 is placed through a plurality of openings 114 to secure the metal sleeve 110 to the top surface of the elongated strips. Preferably, a loaded mold is subjected to pressure from about 10 MPa to about 100 MPa until a desired pressure is obtained.

In some embodiments, the cold press step includes heating the loaded mold 80 after pressurization. This may be desirable when using a thermosetting adhesive where a heating step following cold pressurization will cure the adhesive and bond the wood material and adhesive together. Preferably, the elongated strips are pressurized at about 10 MPa to about 100 MPa until a desired pressure is obtained and then subjected to heat at about 100-150° C. for about 4-8 hours. More preferably, the elongated strips are kept in the mold 80 throughout the cold pressing step to ensure uniform mechanical bonding and shaping of the manufactured wood product. If heating occurs as part of the cold press step, it is preferable for the mold to be made from a heat conducting material such as a metallic alloy. Without being bound by any theory, it is believed that the conductivity of the mold transfers heat through the mold to the loaded elongated strips. It is further believed that this conductive transfer facilitates the effective curing of the adhesive laden elongated strips.

Figure 10:
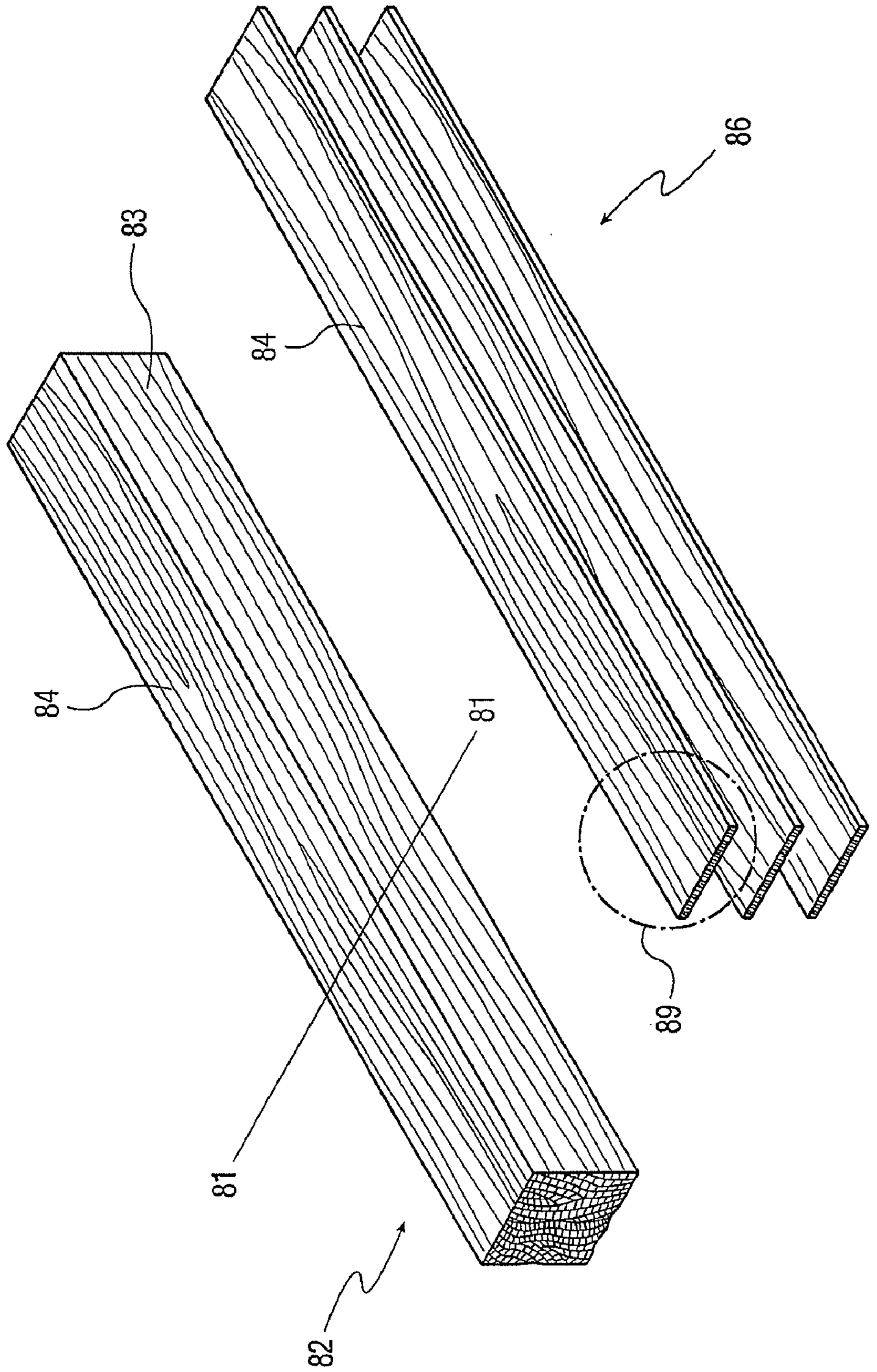
FIG. 10 depicts a manufactured wood block produced by one embodiment of the present invention.

Once the cold press step is complete, the manufactured wood product 82 is removed from the mold. As shown in FIG. 10, once the loaded elongated strips have bonded, a resulting manufactured wood product 82 is removed from the mold 80. The manufactured wood product 82 can be further processed into various cuts of wood, including boards 86, planks, and/or flooring. FIG. 10 shows three boards 86 cut from the manufactured wood product 82.

Figure 13:
FIG. 13 is a drawing showing a top view of a manufactured wood floor board.

As shown in FIGS. 10 and 13, the manufactured wood product 82 has the visual appearance of grain lines 83 and 84. In some embodiments, the grain lines are generally parallel but may curve, intersect, or cross-over one another at some point in the manufactured wood product. These grain lines are created by two processes. First, as discussed, the material used in this process is natural wood such as waste wood, demolition wood, or less desirable wood species. All wood has its own natural grain which creates the look of grain lines when wood products are made from natural wood material. When the wood material such as that shown in FIG. 2A is used in one embodiment of the process, the natural grain lines 29 are incorporated into any manufactured wood product made from the starting material. The wood grain line 29 is preserved by cutting the wood material into elongated strips along the grain 29. Then the cut elongated strips are further processed according to the steps in FIG. 1 where the elongated strips are eventually arranged lengthwise in a mold and pressed into a manufactured wood product.

Figure 11:
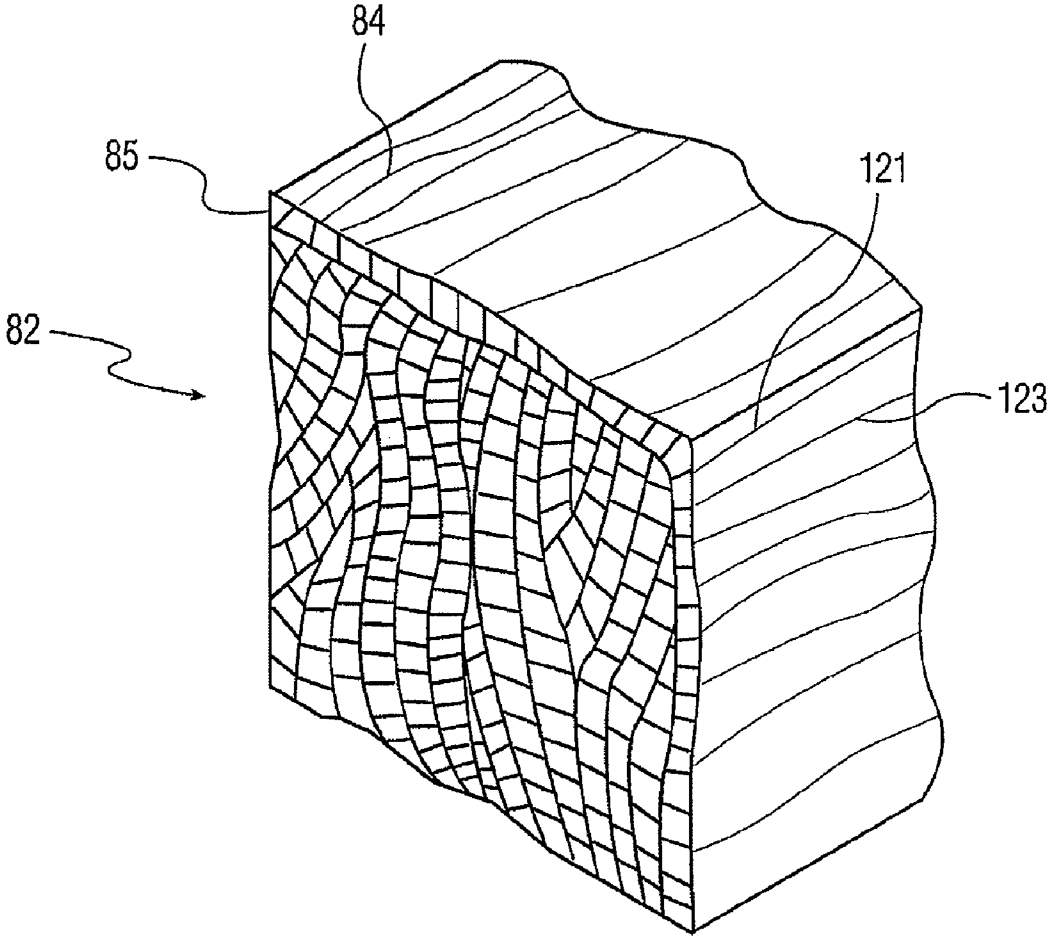
FIG. 11 depicts a cross-sectional view of the wood block in FIG. 10.

In addition to the pre-existing wood grain from the starting material, some embodiments also manufacture a wood grain look by use of the elongate sections in the elongated strips. As discussed above, once the elongated strips are cut from the wood material, the elongated strips are partially separated into elongate sections that are in fibrous connectivity with at least one other elongate section. Once pressed, the contacts between the elongate sections are not seamlessly pressed together. For example, FIG. 11 provides a cross-sectional view of the manufactured wood product along line 81. As shown in FIG. 11, the top layer 85 of wood material in the manufactured wood product 82 has many pressed elongated strips having elongate sections. However, because the elongate sections were partially separated, the pressing creates the look of grain lines 84, 121, and 123 where each elongate section abuts another elongate section.

Figure 12A:
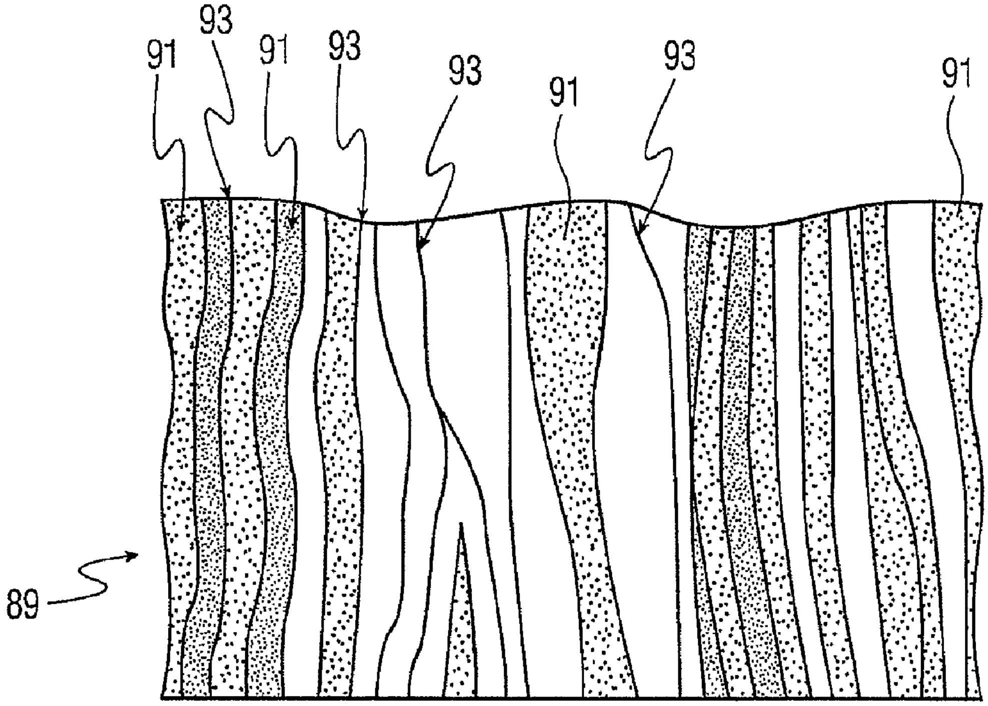
FIG. 12A depicts a top view of a section of a wood board cut from the manufactured wood block in FIG. 10.
Figure 12B:
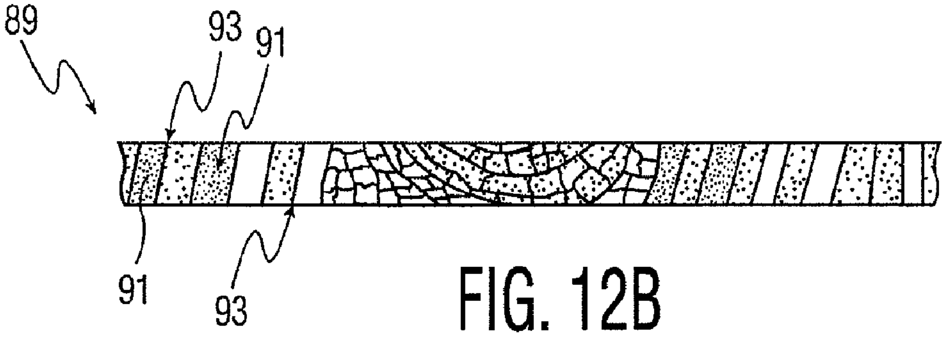
FIG. 12B depicts the side view of one end of the wood board in FIG. 12A.

FIGS. 12A-B depict a top view and a side view of a two inch wide slice of a portion 89 of the wood board 86. As shown in FIG. 12A, the board section 89 has grain lines 91 created from the original starting material and grain lines 93 created from the contact between the pressed elongate sections in the manufactured wood board 86. Similarly, in FIG. 12B, the side view of the board section 89 shows grain lines 91 from the original starting material and grain lines 93 formed from the contact between the pressed elongate sections in the wood board 86. FIG. 13 provides a drawing showing a manufactured wood flooring board cut from a manufactured wood product made by the process described. As shown, the top view of the flooring board shows a natural wood grain appearance where the wood grain is created by the original wood grain and the contact between pressed elongate sections in the wood board.

The result of the natural grain lines from the starting wood material and the created grain lines from the elongate sections is a visually interesting wood pattern that mimics the look of natural wood grain. In particular, FIG. 11 illustrates the uneven orientation of the elongated strips and elongate sections in the manufactured wood product. As shown, the elongate sections and elongated strips are not lined up or stacked evenly with other elongated strips or sections. Rather, the strips and sections are bonded in place with random orientation. This random orientation results in uneven grain lines such as 83 and 84, which in turn provide the manufactured wood product a natural wood grain look.

Figure 14:
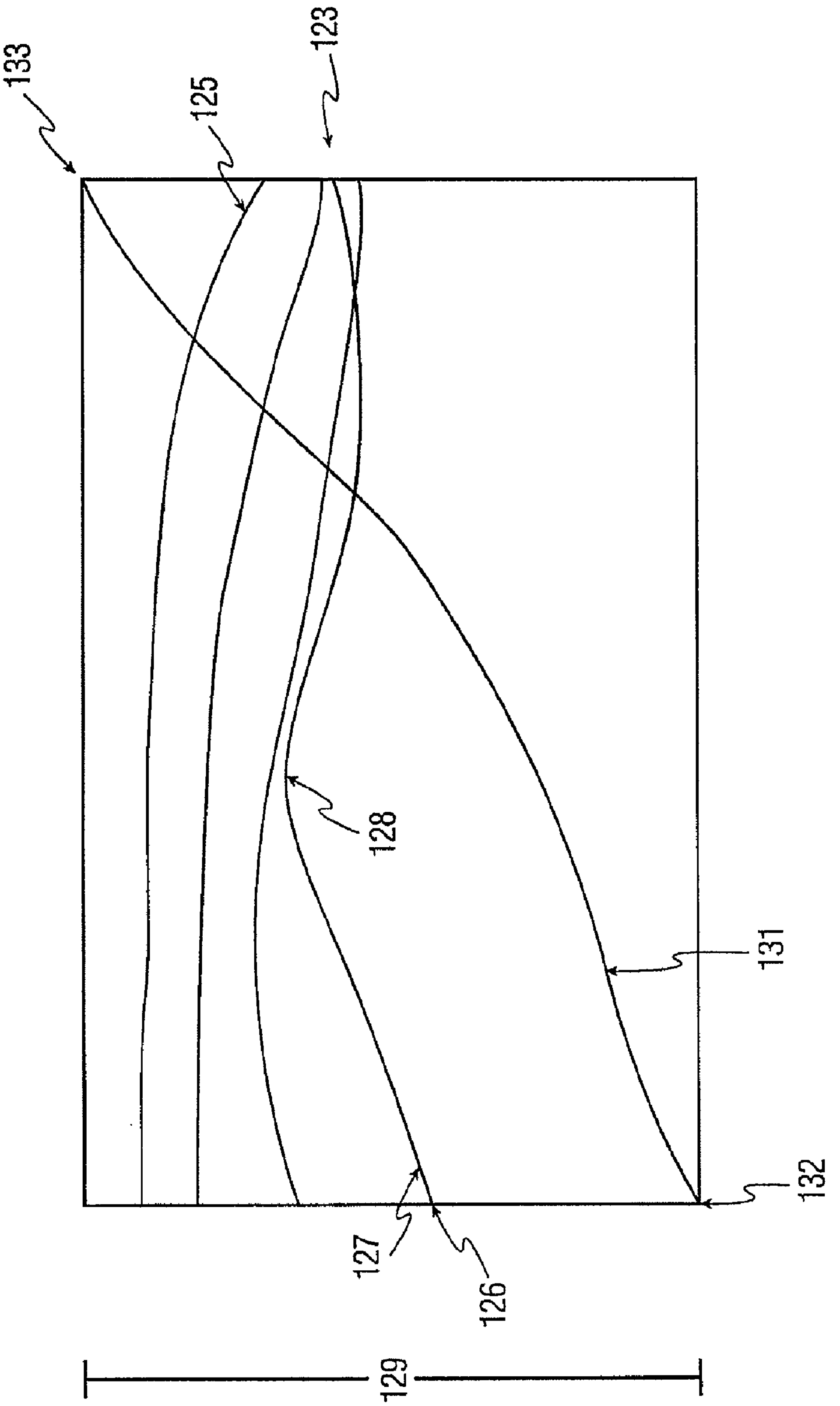
FIG. 14 is a schematic showing a top surface of a manufactured wood product.

FIG. 14 is a schematic showing the top surface of an exemplary manufactured wood product 123 having uneven grain lines 125, 127, and 131 created by the bonded elongated strips and elongate sections. As shown in FIG. 14, the uneven grain lines 125, 127, and 131 in the manufactured wood product can be parallel, intersecting, and/or cross-over at various portions along the length of the grain lines. In addition, the grain lines are disposed generally straight lengthwise through the wood product where the grain lines span the length of the wood product. Although each grain line is generally disposed straight lengthwise through the wood product, the grain line may curve, bend, and deviate at various sections of the grain line. For example, grain line 127 has a first point 126 and a second point 128 where the second point 128 is displaced horizontally along the width 129 of the wood product relative to the first point 126. Similarly, grain line 131 has a first point 132 and a second point 133 where the second point 133 is displaced along the width 129 of the wood product. Although shown as displacement along the width of the wood product, various sections of the grain lines may be displaced along any axis or any direction of the wood product. For example, a second point on a grain line may be vertically displaced relative to the first point. Additionally, the angle and distance of directional displacement along a grain line can be of a wide range. In some embodiments, the directional deviation may be at least four times the width of a strip or an elongate section in any axis or direction.

In some embodiments, the directional displacement of the various sections on a grain line is limited by the dimensions of the mold that the elongated strips are placed in. For example, in FIG. 14 the grain line 131 has a first point 132 and a second point 133 where the displacement between the two points is the mold width 129. Because the elongated strips and sections, which create the grain line 131, extend through the length of the mold from one end of the mold to the other, the displacement points along the grain lines will generally be limited by the dimensions of the mold. This is because the elongated strips and sections are arranged and confined to the mold space for pressing. Thus, any directional displacement would be limited to the space available in the mold.

In other embodiments, the directional displacement of the various sections or points on a grain line is limited by the width of the elongated strip that creates the grain line look. For example, for a grain line created by an elongated strip having a width of 3 cm, the maximum directional displacement of any point on the grain line will be about 3 cm. Without being bound to any theory, it is believed that the fibrous connections between the elongate sections of an elongated strip maintain the width and connectivity between the elongate sections such that when the elongated strips and sections are pressed and bonded, the resulting grain lines exhibit a directional displacement that is limited by the width of the elongated strip. This may be because the fibrous connectivity between the elongate sections limits the movement that is possible for each elongate section within the elongated strip. Thus, the displacement and degree of deviation of the resulting grain line is also limited by the width of the elongated strip, which is maintained by the fibrous connections between the elongate sections. Preferably, in some embodiments, the degree of deviation or directional displacement is between about 1 mm to about 3 cm. In some embodiments, the directional displacement is gradual down the length of some portion of the elongate section or strip. For example, the overall horizontal directional displacement of a strip may be about 1 cm from one end of the strip to the other end, however, the displacement of various points along the length of the strip between the end points may not be 1 cm. Rather, in this example, points along the strip may displace horizontally at 1 mm or 2 mm or 3 mm or 5 mm, between the endpoints. Moreover, there may also be points along the length of the strip were the deviation is wavelike such that portions and points of the strip undulate or curve and bend between the endpoints of the strip.

Instead of cold press, the elongated strips may undergo a hot press step 24. In hot press, the elongated strips are randomly loaded lengthwise in a mold and then simultaneously heated and pressurized. As with the cold press step, any suitable mold and pressure and temperature range may be used depending on factors such as the type of adhesive selected and the dimensions of the elongated strips. In addition, the temperature, duration, pressure, the amount of adhesive strips, and other ranges of the cold press step described may also be applied to the hot press step depending on the mold, adhesive, etc. selected for the hot press process. In some embodiments, the height of the loaded adhesive strips will never extend about 100 cm above the mold for the hot press step. In further embodiments, the ratio of loaded adhesive strips to compressed material will be at a minimum of about 2:1 for hot pressing. In addition, the hot press step may also be accomplished by any methods well known in the art.

In some embodiments, the manufactured wood product may undergo a further moisture reducing step where the wood product is dried to a moisture content desirable for the function that the wood product will be used for. In the context of the flooring industry, it is preferable for wood flooring to have a moisture content of about 5% to about 10% water by weight. Thus, for a manufactured wood product that will be used to make floor boards, it may be necessary to further dry the wood product to reach the desired moisture range. Similarly for other uses, the wood product may be dried to a desired moisture range appropriate for the particular use.

In some embodiments, the manufactured wood product produced by the described methods will exhibit properties as shown below:

| Property | From about | To about |
|---|---|---|
| Hardness | 16067.7N | 19638.3N |
| Dimensional Stability Along the grain | 0.072% Average change in shape along the grain | 0.088% Average change in shape along the grain |
| Dimensional Stability Perpendicular to grain direction | 0.063% Average change in shape perpendicular to the grain | 0.077% Average change in shape perpendicular to the grain |
| Water Absorption | 27% | 33% |
| Moisture Content | 5.85% | 7.15% |
| Compressive Strength Along the Grain | 18.45 MPa | 22.55 MPa |
| Compressive Strength Failure Time | 4.5 mins | 5.5 mins |

In other embodiments, the manufactured wood product formed by the described methods will have an average density of about 1.102 g/cm$^3$.

Once the manufactured wood product is formed by the described process herein, the wood product may be treated to improve the exterior durability of the wood. For example, useful treatment may include additives such as, for example, water repellants, a wood preservative, insecticide, colorant, anti-oxidant, UV-stabilizer, or any combination thereof. The additive may be applied to the wood by using any technique known in the art.

EXAMPLE 1

A Manufactured Wood Floor Board Produced with Scrap Wood Taken from a Flooring Preparation Plant In this example, a manufactured wood flood board was made by using scrap wood pieces from a flooring preparation plant. The scrap wood pieces gathered were of varied dimensions with lengths ranging from about 800 mm-2200 mm, width of about 800 mm, and thickness of about 3 mm. The scrap wood pieces were also generated mainly from the species of Hickory, Red Oak, and Maple. As received, the wood pieces were not segregated by size or dimensions. Approximately four pallets (four cubic meters) of scrap wood was received and processed.

Upon receiving the wood pieces, these were sorted and selected for a minimum thickness of 2 mm, minimum length of 800 mm, and a minimum width of 3 cm. After selecting suitable wood pieces having minimum dimensions, the scrap pieces were then cut into elongated strips with a thickness of 3 mm, width between 3 cm to 5 cm, and a length of at least 800 mm. To the extent possible, the elongated strips were cut to an optimal width of 3 cm and thickness of 3 mm.

Once cut into elongated strips, the wood material was sent through the crushing machine 38 as shown in FIGS. 4-6D. The elongated strips were partially separated into elongate sections where each elongate section maintained fibrous connectivity with at least one other elongate section. The partially separated elongated strips were then set out in stacks to dry in outdoor ambient temperature. The drying process took place for approximately 8 hours at 30° C. and 65%-75% humidity. The moisture content of the elongated strips was measured at 2 hour intervals by measuring a minimum of three locations on the stacks. After drying for 8 hours in 30° C., the tested portions of the elongated strips measured between 12% to 18% water by weight.

The elongated strips were then bundled with string, placed into a large metal cage, and submerged in a 43% phenol formaldehyde solution. The solution also contained water and sodium hydroxide. The solution was kept at room temperature, about 30° C., while the elongated strips were submerged for approximately 8-10 minutes. Then, the adhesive impregnated strips were removed and set aside to drip-dry for 10-12 minutes at room temperature (about 30° C.). After drip-drying for 10-20 minutes the strips were loaded onto a conveyor belt which passed through an oven at a temperature of about 45-65° C. for about half an hour or until the desired water content was reached. In this example, the desired moisture content ranged between about 8% to 12% water by weight.

Once dried, the elongated strips were placed in a rectangular mold. The elongated strips were randomly loaded lengthwise into the mold until the strips filled the mold to higher than the full height of mold. The ratio of the loaded strips was approximately 2.5:1. A metal sleeve was placed over the top of the loaded mold. Then the loaded mold was cold pressed by using a hydraulic press to apply 10 MPa to 100 MPa of pressure until 20 MPa was achieved at room temperature, about 30° C. Once a pressure of 20 MPa was achieved, cylindrical clamps were applied to the pressurized loaded mold to keep the metal sleeve in place while the hydraulic press was removed. The metal sheet with the cylindrical clamps maintained the pressure over the loaded mold after the hydraulic press was removed. Then heat was applied by placing the loaded mold on a conveyor belt and passing the loaded mold through an oven for approximately 6 hours at a temperature between 120° C. to 150° C. In order to solidify and cure the adhesive. The metal sleeve and cylindrical pins maintained the pressure of the loaded mold throughout the heating and subsequent cooling of the loaded mold.

The cured elongated strips were then removed from the molds once the molds were cooled to room temperature (about 30° C.). The resulting manufactured wood blocks were dark brown with striations across the lengths in varying shades of brown and black. The blocks were approximately 100 mm wide, 1 m long, and 140 mm thick.

The manufactured wood blocks were then sliced to create a rectangular floor board. The cut floor boards were then dried until the moisture content was between about 5% to about 10% by weight. Finally, these boards were sanded and further polished into finished floor board products. The measured density for the floor boards was about 1.102 g/cm$^3$.

The finished floor boards were then subjected to several standard performance tests that are well-known in the industry. The tests and results are summarized below:

| Clause | Test Description - Industry Standards | Procedures | Result |
|---|---|---|---|
| Hardness | ASTM D1037-06a, Clause 17 The modified Janka-ball test method used a "ball" 0.444 inches (11.3 mm) in diameter. The load was recorded when the "ball" penetrated one-half its diameter into the panel. | Procedures according to ASTM D1037-06a, Clause 17 Test conducted by combining two single pieces of the manufactured wood boards together where a single board had a thickness 12 mm; The ball was placed on top surface of the board and loaded into the board until half of the ball's diameter penetrated the board. | Maximum load: 17853N used to crack the board. |
| Dimensional stability | EN 434: 1994 For dimensional stability, the relative variation of the distance between marks previously made on the test piece after heat treatment under specified conditions is determined. | Procedures according to EN 434: 1994 Standard | Along grain direction: 0.08% (average) change in shape Perpendicular to grain direction: 0.07%(average) change in shape |

-continued

| Clause | Test Description - Industry Standards | Procedures | Result |
|---|---|---|---|
| Water absorption | EN 12087: 1997 | Procedure according to EN 12087: 1997<br>Used the method 2A (drainage) to determined the long term water absorption by total immersion.<br>A testing specimen was used having size:<br>198 mm × 96 mm × 12 mm.<br>The testing specimen was submerged in water for 14 days.<br>After removal, the moisture content of the specimen increased 30.0% by weight | Moisture content of the specimen increased 30.0% by weight. |
| Moisture content | EN 322: 1993 | Procedure according to EN 322: 1993<br>The tested mass was weighed prior to testing. Then the mass was dried at 103 ± 2° C. until it reached a constant mass. The mass was then cooled to room temperature and weighed again. | Average Moisture content: 6.5% |
| Compressive strength | ASTM D3501-05a<br>Compressive Strength - The first test utilized a compression machine, which compressed the material along the grain of the wood. The machine is used to measure the strength of the wood along the grain direction.<br>Failure Point - A second test was used to determine the amount of pressure the wood is able to handle until it cracks or breaks. | Procedure according to ASTM D3501-05a<br>Used method A - compression test for small specimens,<br>A testing specimen was used having size:<br>36 mm(L) × 100 mm(W) × 6 mm | Class: E1<br>Compressive strength along grain direction - average compressive strength: 20.5 Mpa;<br>Elapsed time to failure: 5.0 mins |
| Class of reaction to fire performance | EN 13501-1: 2007<br>This test is done to determine the flammability and smoke emitted by the building product in the case of a fire.<br>This test examines:<br>(1) the effect a flame (regulated fire) has on the material being tested; and (2) the average smoke obscuration. | Procedure according to EN 13501-1: 2007<br>The claimed class: $C_n$-s1.<br>Product was tested to determine whether it satisfies the following criteria:<br>a) EN ISO 9239-1<br>Critical heat flux ≧4.5 kW/m$^2$<br>Smoke ≦ 750% min; and<br>b) EN ISO 11925-2<br>Exposure = 15 s, $F_s$ ≦ 150 mm within 20 s | Class: $C_n$-s1<br>Critical heat flux = 6.7 kW/m$^2$<br>Smoke ≦ 55% min<br>Exposure = 15 s, $F_s$ < 150 mm within 20 s |

What is claimed is:

1. A manufactured wood product having a natural wood grain appearance extending throughout the length of the wood product such that the wood product is suitable for use in applications where the grain of the wood product is displayed comprising:

a plurality of adhesively bonded elongated strips, said strips comprising a natural wood material and adhesive solution with a ratio of 85%-95% natural wood material to about 5%-15% adhesive, the strips having substantially the same length that extends the length of the manufactured wood product, a width of about 2 cm to 5 cm, and a thickness of about 1 mm to 5 mm; wherein each elongated strip is partially separated into a plurality of elongate sections; wherein each of the elongate sections maintains a fibrous connection with at least one other elongate section;

a natural wood grain look throughout the length of the wood product formed by a plurality of grain lines from the natural wood material and the orientation of the elongated strips and elongate sections in the wood product; and the manufactured wood product having a moisture content between about 5% to about 30% of water by weight, a hardness between about 16067.7N to about 19638.3N, a dimensional stability from about 0.072% to about 0.088% average change in shape along the grain, a dimensional stability from about 0.063% to about 0.077% average change in shape perpendicular to the grain, a water absorption capacity of about 27% to about 33% by weight, a compressive strength along the grain of about 18.45 MPa to about 22.55 MPa, and a compression strength failure time of about 4.5 minutes to about 5.5 minutes.

2. The manufactured wood product of claim 1, wherein the natural wood grain look is further formed by a displacement of a plurality of points along the length of at least one elongated strip.

3. The manufactured wood product of claim 2, wherein the displacement of the plurality of points comprises a first point located along the length of the elongated strip and a second point located along the length of the elongated strip, the location of the second point discrete from the first point and the location of the second point directionally displaced from the first point.

4. The manufactured wood product of claim 3, wherein the second point is directionally displaced from the first point at a distance between about 1 mm to about 3 cm.

5. The manufactured wood product of claim 3, wherein the second point is directionally displaced from the first point at a distance no greater than the width of the elongated strip.

6. The manufactured wood product of claim 1, having an average density of about 1.102 g/cm$^3$.

7. An elongated manufactured wood product having a length, a width and a thickness, comprising:

a plurality of elongate natural wood strips of generally the same length that extend the length of the manufactured wood product, arranged in a generally parallel relationship with one another along the length of the elongated manufactured wood product wherein said elongate wood strips have been pressed and glued together to form the elongated manufactured wood product; wherein each elongate strip is partially separated into a plurality of elongate sections; wherein each of the elongate sections maintains a fibrous connection with at least one other elongate section; and wherein there are from about 7 to about 200 sections present for every cross-sectional square inch of the elongated manufactured wood product;

each wood strip having its own natural wood grain, wherein said natural wood grain extends generally along the length of the strip;

some portion of the wood strips that forms the elongated wood product deviating from the parallel relationship with one another along the length of the elongated wood product by a lateral distance of at least four times the width of the wood strip or section;

wherein the wood grain appearance is provided by the grain of the wood sections and the edges of the elongate wood sections.

8. The elongated manufactured wood product of claim 7, wherein the product is a board, beam or panel.

9. The elongated manufactured wood product of claim 7, wherein the portion of the wood strips that forms the elongated wood product deviates from the parallel relationship with one another along the length of the elongated wood product by a lateral distance, wherein the deviation occurs gradually over a portion of the length between a first point located on the wood strips and a second point located on the wood strips.

* * * * *

UNITED STATES PATENT AND TRADEMARK OFFICE

CERTIFICATE OF CORRECTION

PATENT NO. : 8,268,430 B2
APPLICATION NO. : 12/235511
DATED : September 18, 2012
INVENTOR(S) : Gregory Lawrence Johnson et al.

It is certified that error appears in the above-identified patent and that said Letters Patent is hereby corrected as shown below:

On the Title Page:

(Item 75, Inventors), line 3, change “Zhejian Province” for Jian Hua Li to --Zhejiang Province--.

In the Specifications:

Column 3, line 34, change “thereof,” to --thereof;--.

Column 7, line 15 (Approx.), change “fitch” to --flitch--.

Column 10, line 4, change “51 A” to --51A--.

Column 18, line 19, change “150° C. In” to --150° C. in--.

Signed and Sealed this
Twenty-first Day of May, 2013

Teresa Stanek Rea
*Acting Director of the United States Patent and Trademark Office*